US010509827B1

(12) United States Patent
Pattan et al.

(10) Patent No.: US 10,509,827 B1
(45) Date of Patent: *Dec. 17, 2019

(54) ALLOWING USERS TO CATEGORIZE AND VISUALIZE CONTENT RECOMMENDATIONS

(71) Applicant: Google Inc., Mountain View, CA (US)

(72) Inventors: Neha Pattan, Mountain View, CA (US); Jennifer W. Lin, San Jose, CA (US)

(73) Assignee: Google LLC, Mountain View, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 15/347,588

(22) Filed: Nov. 9, 2016

Related U.S. Application Data

(63) Continuation of application No. 13/397,317, filed on Feb. 15, 2012, now Pat. No. 9,524,077.

(51) Int. Cl.
*G06F 3/00* (2006.01)
*G06F 16/9032* (2019.01)
*G06F 16/904* (2019.01)
*G06F 16/907* (2019.01)
*G06F 3/0482* (2013.01)

(52) U.S. Cl.
CPC ...... *G06F 16/90324* (2019.01); *G06F 3/0482* (2013.01); *G06F 16/904* (2019.01); *G06F 16/907* (2019.01)

(58) Field of Classification Search
CPC .................................................. G06F 3/0482
See application file for complete search history.

(56) References Cited

U.S. PATENT DOCUMENTS

| 6,144,962 | A | 11/2000 | Weinberg et al. |
| 6,851,090 | B1* | 2/2005 | Gutta ................. H04N 7/163 348/E7.061 |
| 6,950,804 | B2* | 9/2005 | Strietzel ............. G06Q 20/102 705/14.49 |
| 8,185,487 | B2* | 5/2012 | Tuzhilin ............. G06Q 30/0631 706/47 |
| 8,473,360 | B2 | 6/2013 | Bolivar |
| 2002/0142722 | A1* | 10/2002 | Gutta ................. H04H 60/65 455/45 |
| 2002/0144259 | A1* | 10/2002 | Gutta ................. G06F 3/011 725/10 |
| 2002/0169851 | A1 | 11/2002 | Weathersby et al. |
| 2003/0172357 | A1* | 9/2003 | Kao ................... G06F 16/353 715/256 |

(Continued)

*Primary Examiner* — Kieu D Vu
*Assistant Examiner* — Andrew Chung
(74) *Attorney, Agent, or Firm* — Fish & Richardson P.C.

(57) ABSTRACT

Methods and systems are provided for allowing a user to categorize, organize, and/or visualize content recommendations made by the user. Various interactive controls are made available to a user who recommends an item of content, where the controls are designed to allow the user to assign one or more attributes (e.g., characteristics, categories, labels, properties, etc.) to the recommendation. A user can also organize content recommendations into one or more categories that can be customized by the user according to subject-matter, content format, recommendation strength, and the like. The user is also provided with the ability to view his or her content recommendations arranged in various graphical representations.

20 Claims, 10 Drawing Sheets

(56) References Cited

U.S. PATENT DOCUMENTS

| | | | |
|---|---|---|---|
| 2004/0001081 A1* | 1/2004 | Marsh | H04H 60/46 715/721 |
| 2004/0176958 A1* | 9/2004 | Salmenkaita | H04M 1/72561 704/275 |
| 2008/0059281 A1* | 3/2008 | Tower | G06Q 30/02 715/230 |
| 2008/0243631 A1* | 10/2008 | Kane | G06Q 30/02 705/14.5 |
| 2008/0301186 A1* | 12/2008 | Svendsen | H04N 1/00318 |
| 2009/0055759 A1* | 2/2009 | Svendsen | G11B 27/00 715/764 |
| 2009/0112837 A1* | 4/2009 | Modani | G06F 16/35 |
| 2009/0158172 A1 | 6/2009 | Ramsaur et al. | |
| 2009/0164929 A1* | 6/2009 | Chen | G06F 16/9535 715/769 |
| 2009/0172551 A1* | 7/2009 | Kane | G06Q 30/02 715/733 |
| 2009/0259621 A1* | 10/2009 | Svendsen | G06F 16/48 |
| 2009/0300547 A1 | 12/2009 | Bates et al. | |
| 2010/0042932 A1 | 2/2010 | Lehtiniemi et al. | |
| 2010/0076968 A1 | 3/2010 | Boyns et al. | |
| 2010/0185662 A1* | 7/2010 | Barile | G06Q 30/0601 707/769 |
| 2010/0186038 A1* | 7/2010 | Thomas | H04N 21/47202 725/42 |
| 2010/0191619 A1 | 7/2010 | Dicker et al. | |
| 2010/0217670 A1 | 8/2010 | Reis et al. | |
| 2010/0251141 A1* | 9/2010 | Sabin | G06F 16/958 715/758 |
| 2010/0257059 A1* | 10/2010 | Fujioka | G06F 3/048 705/14.66 |
| 2010/0274802 A1* | 10/2010 | Abe | G06F 16/58 707/769 |
| 2010/0281384 A1 | 11/2010 | Lyons et al. | |
| 2010/0332330 A1 | 12/2010 | Goel et al. | |
| 2011/0004826 A1 | 1/2011 | Cho | |
| 2011/0055699 A1* | 3/2011 | Li | G06F 16/951 715/709 |
| 2011/0113051 A1* | 5/2011 | Lindahl | G11B 27/105 707/758 |
| 2011/0119626 A1* | 5/2011 | Faenger | G06F 3/0482 715/811 |
| 2011/0145719 A1* | 6/2011 | Chen | G06Q 10/10 715/739 |
| 2011/0196922 A1* | 8/2011 | Marcucci | H04W 4/21 709/204 |
| 2011/0208801 A1 | 8/2011 | Thorkelsson et al. | |
| 2011/0302032 A1 | 12/2011 | Ishii | |
| 2011/0302531 A1* | 12/2011 | Takushima | G06Q 30/02 715/811 |
| 2011/0307354 A1* | 12/2011 | Erman | G06F 8/60 705/27.1 |
| 2012/0030135 A1 | 2/2012 | Weiss et al. | |
| 2012/0030553 A1* | 2/2012 | Delpha | G06F 16/435 715/205 |
| 2012/0030554 A1* | 2/2012 | Toya | H04N 7/17318 715/206 |
| 2012/0042283 A1 | 2/2012 | Tuesta et al. | |
| 2012/0072846 A1 | 3/2012 | Curtis | |
| 2012/0078747 A1* | 3/2012 | Chakrabarti | G06Q 30/0601 705/26.7 |
| 2012/0130847 A1* | 5/2012 | Kalin | G06Q 30/0631 705/26.7 |
| 2012/0159337 A1* | 6/2012 | Travilla | G06Q 30/0631 715/738 |
| 2012/0284245 A1* | 11/2012 | Portnoy | G06F 16/9535 707/706 |
| 2013/0036344 A1* | 2/2013 | Ahmed | G06F 16/9535 715/205 |
| 2013/0073983 A1* | 3/2013 | Rasmussen | G06Q 30/02 715/753 |

\* cited by examiner

ALLOWING USERS TO CATEGORIZE AND VISUALIZE CONTENT RECOMMENDATIONS

CROSS-REFERENCE TO RELATED APPLICATIONS

This application is a continuation application of, and claims priority to, U.S. patent application Ser. No. 13/397,317, titled "ALLOWING USERS TO CATEGORIZE AND VISUALIZE CONTENT RECOMMENDATIONS," filed on Feb. 15, 2012. The disclosure of the foregoing application is incorporated herein by reference in its entirety for all purposes.

The present disclosure generally relates to systems and methods for providing content to users. More specifically, aspects of the present disclosure relate to determining the intent of a user's content recommendations by providing the user with the abilities to organize and visualize such recommendations.

BACKGROUND

As online content continues to grow in both volume and variety, consumers (hereinafter referred to simply as "users") are presented with an increasing number of opportunities to explore new areas of interest and generally stay informed about things that are important to them. With various Internet-related technologies now providing means for fast and easy communications, a user often shares or exchanges content that he or she finds enjoyable or useful with other users, such as friends, family, colleagues, and the like.

Because of the wealth of information available and the frequency with which such information is shared, it can be difficult for a user to recall all the various content he or she enjoyed and/or suggested to others.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method comprising: generating, by a server, a user content recommendation based on at least one component of a content item recommended by a user; receiving data relating to the user content recommendation; determining candidate attributes applicable to the user content recommendation; providing candidate attributes for selection; receiving from the user, in response to the providing, an indication of a selection corresponding to at least one of the candidate attributes; assigning at least one attribute to the user content recommendation based on the selection received from the user; and serving, via a network, a user interface screen to a computing device in a format suitable for presentation on the computing device, the user interface screen identifying the at least one attribute assigned to the user content recommendation.

In another embodiment, the method further comprises: receiving an indication that the user recommended content; parsing the recommended content to identify components of the content; and determining candidate attributes for the recommended content based on the parsed components.

In still another embodiment, the method further comprises: receiving an indication that the user recommended content; parsing the recommended content to identify components of the content; using the parsed components of the recommended content to identify similar content recommended by the user; and determining candidate attributes for the recommended content based on attributes assigned to the similar content recommended by the user.

In another embodiment, the method further comprises mapping the candidate attributes to the user content recommendation, and storing the candidates attributes mapped to the user content recommendation.

In yet another embodiment, the step of determining the candidate attributes applicable to the user content recommendation includes, in response to receiving the data relating to the user content recommendation, retrieving the stored candidate attributes mapped to the user content recommendation.

Another embodiment of the present disclosure relates to a method comprising: receiving, at a server, a request for a content recommendation history for a user, the content recommendation history being based on content recommendations made by the user; querying the user to select at least one of a plurality of display properties for the content recommendation history; receiving from the user, in response to the query, a selection corresponding to at least one of the display properties; generating a user interface screen based on the selection received from the user, the user interface screen identifying the content recommendations made by the user, arranged according to the at least one display property; and serving, via a network, the user interface screen to a computing device in a format suitable for presentation on the computing device.

In another embodiment, the method further comprises: in response to receiving the request to view the content recommendation history, querying the user to select a group of the content recommendations made by the user for inclusion in the content recommendation history; receiving from the user, in response to the query, a selection corresponding to a group of content recommendations made by the user; generating a user interface screen based on the group of content recommendations made by the user, the user interface screen identifying the group of content recommendations arranged according to the at least one display property; and serving, via the network, the user interface screen to the computing device in a format suitable for presentation on the computing device.

In still another embodiment, the method further comprises: querying the user to select at least one of a plurality of comparison groups of content recommendations for inclusion in the content recommendation history; receiving from the user, in response to the query, a selection corresponding to at least one of the comparison groups of content recommendations; generating a user interface screen based on the group of content recommendations made by the user and the at least one comparison group of content recommendations, the user interface screen identifying both the group of content recommendations made by the user and the at least one comparison group of content recommendations; and serving, via the network, the user interface screen to the computing device in a format suitable for presentation on the computing device.

Yet another embodiment of the present disclosure relates to a system for identifying a component of content recommended by a user, the system comprising at least one processor and a computer-readable medium coupled to the at least one processor having instructions stored thereon which, when executed by the at least one processor, causes the at least one processor to: receive a request to assign an attribute to a content recommendation made by a user; determine candidate attributes applicable to the content recommendation; query the user to select at least one of the candidate attributes to assign to the content recommendation; receive from the user, in response to the query, a selection corresponding to at least one of the candidate attributes; assign at least one attribute to the content recommendation based on the selection received from the user; and serve, via a network, a user interface screen to a computing device in a format suitable for presentation on the computing device, the user interface screen identifying the at least one attribute assigned to the content recommendation.

In another embodiment, the at least one processor of the system is further caused to: receive an indication that the user recommended content; parse the recommended content to identify components of the content; and determine candidate attributes for the recommended content based on the parsed components.

In another embodiment, the at least one processor of the system is further caused to: receive an indication that the user recommended content; parse the recommended content to identify components of the content; use the parsed components of the recommended content to identify similar content recommended by the user; and determine candidate attributes for the recommended content based on attributes assigned to the similar content recommended by the user.

In still another embodiment, the at least one processor of the system is further caused to map the candidate attributes to the content recommendation made by the user, and store the candidates attributes mapped to the content recommendation.

In still another embodiment, the at least one processor of the system is further caused to, in response to receiving the request to assign an attribute to the content recommendation, retrieve the stored candidate attributes mapped to the content recommendation.

In other embodiments, the methods and systems described herein may optionally include one or more of the following features: the user content recommendation applies to at least one of the components of the recommended content; the at least one attribute assigned to the user content recommendation is one or both of a category for the user content recommendation and a strength for the user content recommendation; the at least one comparison group of content recommendations is a group of content recommendations made by at least one other user in a social network of the user; the at least one comparison group of content recommendations is a second group of the content recommendations made by the user, the second group of the content recommendations being different from the group of the content recommendations; the plurality of display properties includes a plurality of graphical representation formats; and/or the plurality of display properties further includes a plurality of attributes of the content recommendations made by the user.

Further scope of applicability of the present disclosure will become apparent from the Detailed Description given below. However, it should be understood that the Detailed Description and specific examples, while indicating preferred embodiments of the disclosure, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
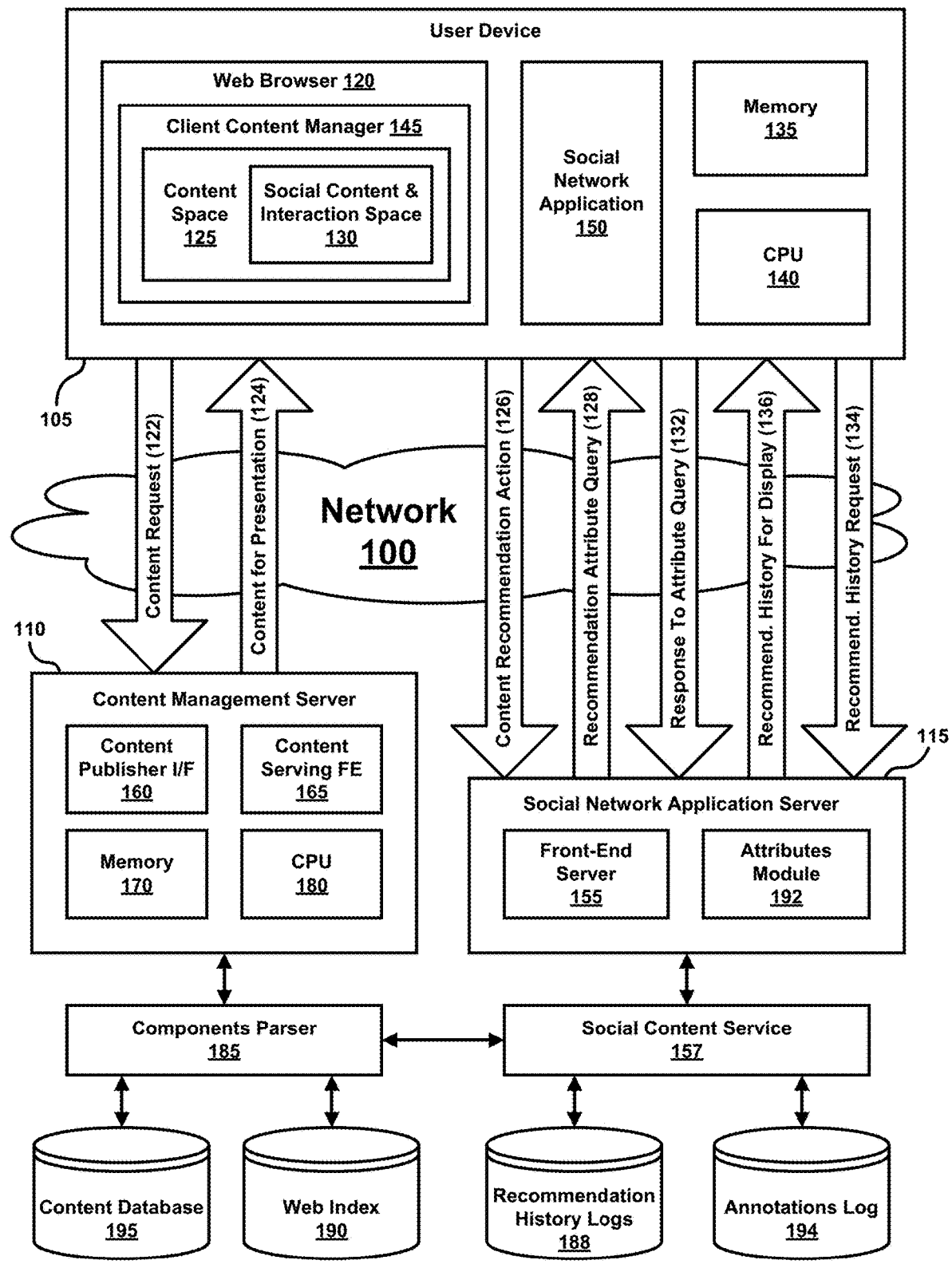
FIG. 1 is a block diagram illustrating an example content presentation system and surrounding environment in which various embodiments of the present disclosure may be implemented.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various embodiments and examples of the present disclosure will now be described. The following description provides specific details for a thorough understanding and enabling description of these embodiments and examples. One skilled in the relevant art will understand, however, that the various embodiments of the present disclosure may be practiced without many of these details. Likewise, one skilled in the relevant art will also understand that embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for providing a user with the abilities to categorize, organize, and/or visualize his or her content recommendations. A variety of interactive controls are made available to a user who recommends content, where the controls are designed to allow the user to assign one or more attributes (e.g., characteristics, categories, labels, properties, etc.) to the recommendation. For example, a user who recommends a funny video may wish to assign a strength to the recommendation, where the strength indicates a level or degree of seriousness to attach to the user's recommendation (e.g., "strongly recommend," "slightly recommend," etc.).

According to some embodiments, a user may also organize his or her content recommendations into one or more content recommendation "buckets" (e.g., categories, groups, collections, sets, etc.) that can be customized by the user according to subject-matter, content format, recommendation strength, and the like. For example, a user may create content recommendation buckets such as "News Articles," "Restaurant Reviews," "Sports," and "Funny Videos," which can be used to organize (e.g., categorize, sort, group, etc.) relevant content recommendations. In addition to providing the user, and depending on the implementation one or more other users (e.g., the user's friends or acquaintances in a social network), with the ability to quickly locate and view a particular content recommendation made by the user, the content recommendation buckets described herein also provide the user with additional options when utilizing various content recommendation visualization controls, which are described in further detail below.

In one or more embodiments, a user is also provided with the ability to view (e.g., visualize) his or her content recommendations arranged in any of a variety of forms and according to the user's selected visualization preferences. For example, the user may view a content recommendation history in which the user's content recommendations are arranged for display to the user in one or more of a variety of graphical representations and/or charts, such as line graphs, bubble graphs, pie charts, etc. Such graphical representations and/or charts allow the user to, among other things, view his or her content recommendations over a period of time, which may or may not be specified by the user, and also view various comparisons between the content recommendations made by the user and, for example, the content recommendations made by one or more other users in a social network of the user.

In at least one implementation, the user is provided with one or more content recommendation visualization controls whereby the user can make selections corresponding to particular content recommendations (e.g., content recommendation buckets that the user has created) to be included in the user's content recommendation history. These visualization controls may also allow the user to make selections as to various display preferences, such as graph/chart type, whether to include a legend, start/end dates or date ranges (e.g., "past three months"), as well as numerous other items relevant to such displays of content.

Additionally, where a user recommends content comprising a plurality of separable (e.g., distinguishable, separately identifiable, etc.) components, subjects, features, properties, etc., the methods and systems described herein allow a user to refine his or her recommendation by selecting one or more characteristics to be applied or attributed to the recommendation. In this manner a determination can be made as to the user's intent with regard to the recommendation, and therefore more detailed social content (e.g., social annotations) generated as a result. The following descriptions of various embodiments and examples sometimes collectively refer to the components, subjects, features, properties, etc., of content as "content components" or simply "components," for purposes of brevity.

A user in a social network (e.g., an online community or system that provides a forum for users who are in different geographic locations to interact with each other) may wish to indicate that he or she likes, approves, suggests, or enjoys a particular content item (e.g., an ad or web page) such that one or more other users in the social network will be made aware of this indication when they are presented with the same content item. Accordingly, the user may make a recommendation of the content item.

In at least some embodiments of the present disclosure, a user can recommend content by interacting with (e.g., selecting) a user recommendation control (e.g., widget, tool, point, button, etc.) provided for display to the user along with the content. This user recommendation control may be configured to allow a user to indicate, for example, that he or she recommends, likes, suggests, approves, or has some other opinion about the content. Depending on the implementation, the user recommendation control may be configured to allow a user to publish (e.g., make known to one or more other users in a social network and/or more broadly to the public in general) an opinion (e.g., emotion, reaction, perception, impression, view, etc.) that he or she has about the content.

In at least some scenarios a user's recommendation of content may be in the form of a recommended uniform resource locator (URL) that specifies the location of the content. For example, a user may recommend a URL of a web page or of an ad that the user finds enjoyable or helpful. While in some instances the user may intend for his or her recommendation to be for the entire web page or ad to which the URL points, in other instances the user's recommendation relates to a particular component (e.g., an image, a video, a portion of text, etc.), subject (e.g., Hawaii vacation, 5% discount, pizza, etc.), or characteristic (e.g., image is in Graphics Interchange Format (GIF) file format, the ad is a banner type ad, etc.) of the web page or ad. Such components, subjects, characteristics, properties, etc., are separable in the sense that they each contribute to the content as a whole in one or more ways.

One or more embodiments of the present disclosure relate to providing a user with suggested attributes to assign to a content recommendation based on components included in the content. Additionally, in some embodiments the suggested attributes may also be based on a content recommendation history for the user. As described in greater detail herein, a user's content recommendation history may be used to identify trends in subject-matter of recommended content, attributes commonly assigned by the user to content recommendations, as well as numerous other statistical and analytical determinations related to content recommended by the user.

At least one embodiment described herein relates to parsing content, such as an advertisement or a web page, received from content publishers to create a database of content components that can be used (e.g., retrieved, referenced, etc.) to generate a recommendation attribute query (e.g., attribute questionnaire) for presentation to a user. As will be described in greater detail herein, each item of content received from a content publisher may be analyzed or parsed to identify various components comprising the content. For example, where the content item is an advertisement received from an advertiser, the advertisement may be parsed for components such as type of business, product/service, location, discount/offer, image/text, and so on. Similarly, where the content received is a web page, the web page may be parsed for images, keywords, ratings, etc. Received content items may be mapped to their respective parsed components and stored in one or more databases for use in generating a recommendation attribute query.

In at least some embodiments, content received from content publishers is parsed using conventional parsing techniques. For example, content comprising a received web page or advertisement can be crawled (e.g., using a web crawler or other similar automated computer program capable of scanning, reading or "crawling" a web page, advertisement, and/or other such content to collect information contained therein) and keyword clusters derived therefrom for use in parsing the web page or advertisement. Additionally, in other embodiments the content publishers or advertisers can provide keywords (e.g., tags) along with the received content, which can be used to identify the various components comprising the content.

Other features of one or more embodiments described herein relate to generating detailed social annotations for presentation with recommended content (e.g., a web page, an ad, etc.) based on a user's response to a recommendation attribute query. For example, if a user assigns a particular attribute or characteristic to his or her content recommendation, then when the content to which the recommendation applies is provided to other users in the user's social network (e.g., other users who are in some type of acquaintance relationship with the recommending user, such as the user's "connections," "friends," "circles," etc.), the content may be presented (e.g., on a display of a computer or other similar device) in conjunction with an annotation detailing the attribute or characteristic assigned by the user.

The present disclosure contains some examples described in the context of advertisements. An advertisement is an entity (e.g., video, audio file, image, text, etc.) that presents a piece of information to a user and is designed to be used in whole or in part by the user. Ads can be provided (e.g., presented) to a user in electronic form, such as banner ads on a web page, as ads presented in a user interface associated with an application (e.g., a third-party application running on a user device), as ads presented with search results, as ads presented with emails, and the like. Such electronic ads may also contain links to other electronic content including web pages, images, audio files video files, etc. Advertisements may also be referred to as "promotional content" or one or more other similar such terms.

When a user makes a request for on-line content, such as a web page, a video/audio clip, a game, or other online resource, one or more content requests can be initiated to retrieve the requested content from content publishers for presentation to the user on a user device (e.g., personal computer, telephone, personal digital assistant (PDA), television system, etc.). Examples of content publishers include publishers of web sites, search engines that publish search results in response to a query, and numerous other sources or parties that make information and/or experiences available for presentation to a user. In some arrangements, one or more additional items of content, such as advertisements, may be provided along with the requested content. In such instances advertisers who provide the advertisements may also be considered content publishers.

In at least one scenario a user may be a member of a social network comprised of many other users, some of whom share a connection with the user or are in one of a variety of relations with the user. In such a social network context, a user may wish to make his or her content recommendations available for viewing by one or more other social network users. Furthermore, the user may also wish to assign one or more attributes to such content recommendations, where the assigned attributes can be displayed in conjunction with the user's content recommendations to clarify and/or provide additional detail about the content recommendations.

In at least some embodiments, a recommendation attribute query is provided for presentation to a user in response to receiving a request to assign an attribute to a content recommendation made by the user. Depending on the implementation, the recommendation attribute query can be in the form of a user interface screen overlaid on one or more of the user's content recommendations, or can be a separate user interface screen presented by itself to the user. In either such implementation, the recommendation attribute query may list or otherwise identify various attributes available for the user to select for assignment to a particular content recommendation indicated by the user. It should be understood that the recommendation attribute query described in connection with various embodiments may also be provided for presentation in numerous other forms and/or formats in addition to or instead of the example forms and formats described above.

It should also be noted that the recommendation attribute query described herein may be referred to in numerous other ways in addition to or instead of "recommendation attribute query," without departing from its intended meaning and without limiting any of its features and/or functionalities. For example, the recommendation attribute query may also be referred to as an "attribute questionnaire," "attribute query", "recommendation attribute screen," as well as other identifiers, names and labels similar in nature to those mentioned. Irrespective of the term or phrase used to refer to the recommendation attribute query, in the various embodiments described herein the recommendation attribute query allows a user to assign (e.g., select, designate, indicate, identify, choose, etc.) one or more attributes (e.g., characteristics, properties, etc.) to a content recommendation made by the user for at least the purpose of providing additional clarification and/or detail about the recommendation.

While some of the examples provided in the present disclosure focus primarily on content recommendations made by a user where the content items to which the recommendations apply are web pages and/or advertisements, the various features described herein, including content recommendation attributes, content recommendation history, social annotations, and other features presented below can also be used in other contexts and with other types of content, in addition to or instead of web pages and/or advertisements.

FIG. 1 shows an example content presentation system and surrounding environment in which various embodiments described herein may be implemented. The example system and environment shown includes a user device 105, a content management server 110, and a social network application server 115. The example environment also includes a network 100, such as a local area network (LAN), a wide area network (WAN), the Internet, or a combination thereof. The network 100 connects the user device 105, the content management server 110, the social network application server 115, and can also connect additional devices and/or servers of the same or different type (not shown). The example system also includes a components parser 185, a content database 195, a web index 190, a social content service 157, an annotations log 194, and recommendation history logs 188. These and other components of the system and environment shown in FIG. 1 will be described in greater detail below.

In scenarios where the content presentation system of FIG. 1 is implemented in a more content-specific context, any of the various components comprising the system may be referred to by numerous other names or identifiers in addition to or instead of those shown without limiting any of the features or capabilities of these components or of the overall system as described herein. As one example, in the context of selecting and presenting advertisements (sometimes referred to simply as "ads"), content management server 110 may be referred to as an "ad management server," the content publisher interface 160 referred to as an "advertiser publisher interface," and the content serving front-end 165 referred to as an "ad serving front-end." It should also be understood that while the following description of various features of the content presentation system sometimes makes reference to advertisements and/or web pages, other forms of content, including other forms of sponsored content, may also be selected and provided in the content presentation system.

The user device 105 can be any of a number of different electronic devices under control of a user and capable of requesting and receiving resources. As used herein, a resource is any data that can be provided over the network 100, and can be identified by a resource address associated with the resource. Examples of resources include images, video, HTML pages, content (e.g., words, phrases, images, etc.), embedded information such as meta-information and hyperlinks, and also embedded instructions, such as JavaScript scripts. Examples of the user device 105 can be one or more personal computers, telephones, personal digital assistants (PDAs), television systems, etc., that are capable of sending and receiving data over the network 100. The user device 105 can also be a portable user device, such as a laptop computer, tablet computer, mobile communication device (e.g., cell phone, smartphone), and the like, capable of also sending and receiving data over the network 100.

The user device 105 may include one or more web browser tools 120 for viewing and interacting with web pages via a wired or wireless internet connection and/or via a mobile data exchange connection such as cellular, optical, near field communication, or some combination thereof. The web browser 120 may include a client content manager 145, designated content space 125, and designated social content and interaction space 130. The content space 125 may be for the display of various types of content, such as advertisements related to web page content, search results, web-based e-mail, and the like. The designated social content and interaction space 130 may be for the display of relevant social network content (e.g., social annotations provided to the user device 105 via a social network application 150) and various user interaction tools, such as a user recommendation control that may be configured to allow a user to make a recommendation of content to other users in one or more social networks. In at least some embodiments, the user device 105 may also include a computer processing unit (CPU) 140, a memory 135, and a social network application 150. Further details regarding the social network application 150 and the user recommendation control will be provided below.

The user device 105 may also include one or more applications (not shown), which in some embodiments may be third-party applications separate from (e.g., not associated or affiliated with) the social network application 150, the content management server 110, and the social network application server 115. These applications can consist of software that runs on the user device 105 and performs certain functions or tasks for a user, such as providing user interfaces for messaging services or providing services related to games, videos, or music. Such an application may also be a mobile application consisting of software designed to run on a mobile user device, such as a cell phone or smartphone. Some example types of applications include multimedia (e.g., video or audio players, graphic or image viewers, etc.), communication (e.g., news or information clients, messaging or e-mail clients, etc.), games, productivity (e.g., calculators, calendars, task managers, etc.), as well as numerous other categories and types. An application running on the user device 105 may similarly include a client content manager 145 and designated content space 125 for the display of content (e.g., web pages, ads, etc.) related to the application.

Content publishers may directly or indirectly submit, log, maintain, and utilize information in the content management server 110. For example, content publishers may access and/or interact with the content management server 110 via a content publisher interface (I/F) 160. Additionally, depending on the implementation, content publishers may be able to access and/or interact with the content management server 110 in one or more other ways. In at least some embodiments, content publishers, such as advertisers, can provide content to the content management server 110 via the content publisher interface 160, and the content management server 110, in turn, can present the content for presentation 124 (to the user device 105 using various methods described in greater detail below. Such content may be presented to the user device 105 in response to a content request 122 received at the content management server 110.

In at least a scenario where the content request 122 received at the content management server 110 includes a request for advertising content, the advertisement content provided for presentation 124 may be in the form of graphical ads, such as banner ads, audio ads, video ads, still image ads, text-only ads, as well as ads combining one or more of any such forms. The content (e.g., ads) received at the content management server 110, and similarly provided to the user device 105 may also include embedded information or data, including links to one or more web pages, meta-information, and/or machine-executable instructions.

Although the client content manager 145 is illustrated in FIG. 1 as being a part of web browser 120, in some embodiments of the disclosure the client content manager 145 may be a logically separate unit from the web browser 120. Additionally, the client content manager 145 may become embedded within the web browser 120 and thus may form an integral part of the web browser 120. Similarly, in embodiments where the user device 105 contains one or more applications (not shown), the client content manager 145 may be contained or embedded within such applications or instead be a logically separate unit. The client content manager 145 manages content for the web browser 120, including sending content requests 122 to the content management server 110 and receiving content from the content management server 110 for presentation on (e.g., a display (not shown)) of the user device 105. In at least one embodiment, the web browser 120 may request content directly from the content management server 110, and also receive requested content from the content management server 110.

The social network application 150 may be client software running on the user device 105. In at least some embodiments, the social network application 150 manages a user's personal identification information (e.g., a personal cookie) and data regarding the user's accounts, including a social networking account. In one example, a social networking account is unique to a user, and represents the user for purposes of the user interacting with the content management server 110 and the social network application server 115, as well as for social networking.

In one or more embodiments, the social network application server 115 includes front-end server 155 and attributes module 192. The front-end server 155 may be configured to exchange data and information with social content service 157. In some arrangements, the data and information exchanged between the front-end server 155 and the social content service 157 may include social annotation information maintained in one or more social annotations logs 194. Additionally, the front-end server 155 may be configured to provide a recommendation attributes query 128 from the social network application server 115 to the user device 105.

Furthermore, in at least one embodiment the content recommendation attributes module 192 (identified in the example system of FIG. 1 simply as "Attributes Module" for purposes of brevity) contained within the social network application server 115 is configured to receive from the user device 105 a response to the attribute query 132, which may be a response to recommendation attribute query 128 sent to the user device 105 when, e.g., a user wishes to add, remove or change an attribute of a content recommendation (e.g., a content recommendation generated as a result of the content recommendation action 126). In some implementations, the recommendation attribute query 128 may also be sent to the user device 105 for presentation to a user in response to the user first making a recommendation of content (e.g., by selecting or otherwise interacting with a user recommendation control provided by the social network application server 115 to the user device 105 for display in conjunction with the content).

The content recommendation attributes module 192 may be configured to receive one or more content recommendation actions 126 from the user device 105. In at least one example, a content recommendation action 126 may be an indication corresponding to a user's selection of one or more content recommendations in conjunction with one or more controls (e.g., included in a user interface screen provided for display to the user on a display of the user device 105) configured to allow the user to perform a variety of actions or operations on the selected one or more content recommendations. Additional details and description about such content recommendations, controls, and user interfaces, in the context of one or more embodiments of the present disclosure, will be provided below.

As will also be further described below, the social network application server 115 may log one or more content recommendation actions 126 (e.g., a user performing one or more of a variety of actions in-connection with a content recommendation made by the user) in one or more recommendation history logs 188. The data stored in the recommendation history logs 188 may be used, for example, to generate a content recommendation history 136 that may be provided to the user device for display to a user in response to the social network application server 115 receiving a request for the user's content recommendation history 134.

The content management server 110 may also be in communication with a components parser 185. In at least some embodiments, the components parser 185 may be configured to parse content items received from content publishers (e.g., via the content publisher interface 160) using one or more conventional parsing techniques. For example, content comprising a web page or advertisement received at the content management server 110 can be crawled by the components parser 185, which may be configured as, or configured to implement, a web crawler or other similar automated computer program capable of scanning, reading or "crawling" such content.

The components parser 185 may crawl a web page, advertisement, and/or other such content to collect information contained therein and derive keyword clusters for use in parsing the content. The components parser 185 may store data corresponding to parsed content components in one or both of content database 195 and web index 190. As will be further described below, components of a content item parsed out by the components parser 185 may be used as the basis for generating the recommendation attribute query 128 provided to the user device 105 for presentation to a user in response to the user making a recommendation of the content item (e.g., content recommendation action 126).

In some embodiments content publishers (e.g., advertisers) may supplement content items provided to the content management server 110 (e.g., via the content publisher interface 160) with additional information about the content. For example, a content publisher may provide information about one or more tags that can be used to identify various components of a particular content item served by the content management server 110 to the user device 105. In some arrangements these tags may be used to generate the recommendation attribute query 128 that is provided to the user device 105 for presentation to a user in response to the user making a recommendation of a content item (e.g., content recommendation action 126 from the user device 105 to the social network application server 115) being displayed on the user device 105.

In various embodiments described herein, content may be provided for presentation 124 in the web browser 120 of the user device 105 in conjunction with a user recommendation control (e.g., widget, tool, button, etc.) and one or more social annotations (e.g., social content). In such embodiments, the user recommendation control and/or the one or more social annotations (neither of which are shown in the example system of FIG. 1) may be provided for presentation in the designated social content and interaction space 130 of the client content manager 145. For example, the social network application server 115 may provide, for display with (e.g., as an overlay on) an item of content provided for presentation 124 by the content management server 110, a user recommendation control generated by a social content service 157. The social network application server 115 may be a web-application server, which is a front-end that hosts the social network application 150 running on the user device 105 and also the user recommendation control provided to the user device 105. The social network application server 115 may be configured to exchange authentication credentials (e.g., content/ad share tokens) and user information with the social content service 157 such that the social content service 157 retrieves social annotations and other related social content and information from annotations log 194 for use in rendering the user recommendation control.

In any of the embodiments of the present disclosure, conventional content serving methods and systems may be utilized in conjunction with the various features described herein. Additionally, in at least some embodiments the content management server 110, in response to receiving a content request 122 from the user device 105, identifies one or more candidate content items (e.g., candidate ads) from the content database 195, selects a particular one of the candidate content items, and provides the selected candidate content item for presentation 124 to the user device 105. Depending on the implementation, the content management server 110 may conduct an auction (e.g., a "content auction" or an "ad auction" in the case of advertisements) to determine which candidate content item will be selected for presentation 124.

Certain user data may be rendered anonymous in one or more ways before being stored and/or used. In some examples, a user's geographic location may be generalized in situations where location information is obtained (e.g., limited to a city, zip code, or state level) so that a particular location of a user cannot be determined.

Figure 2:
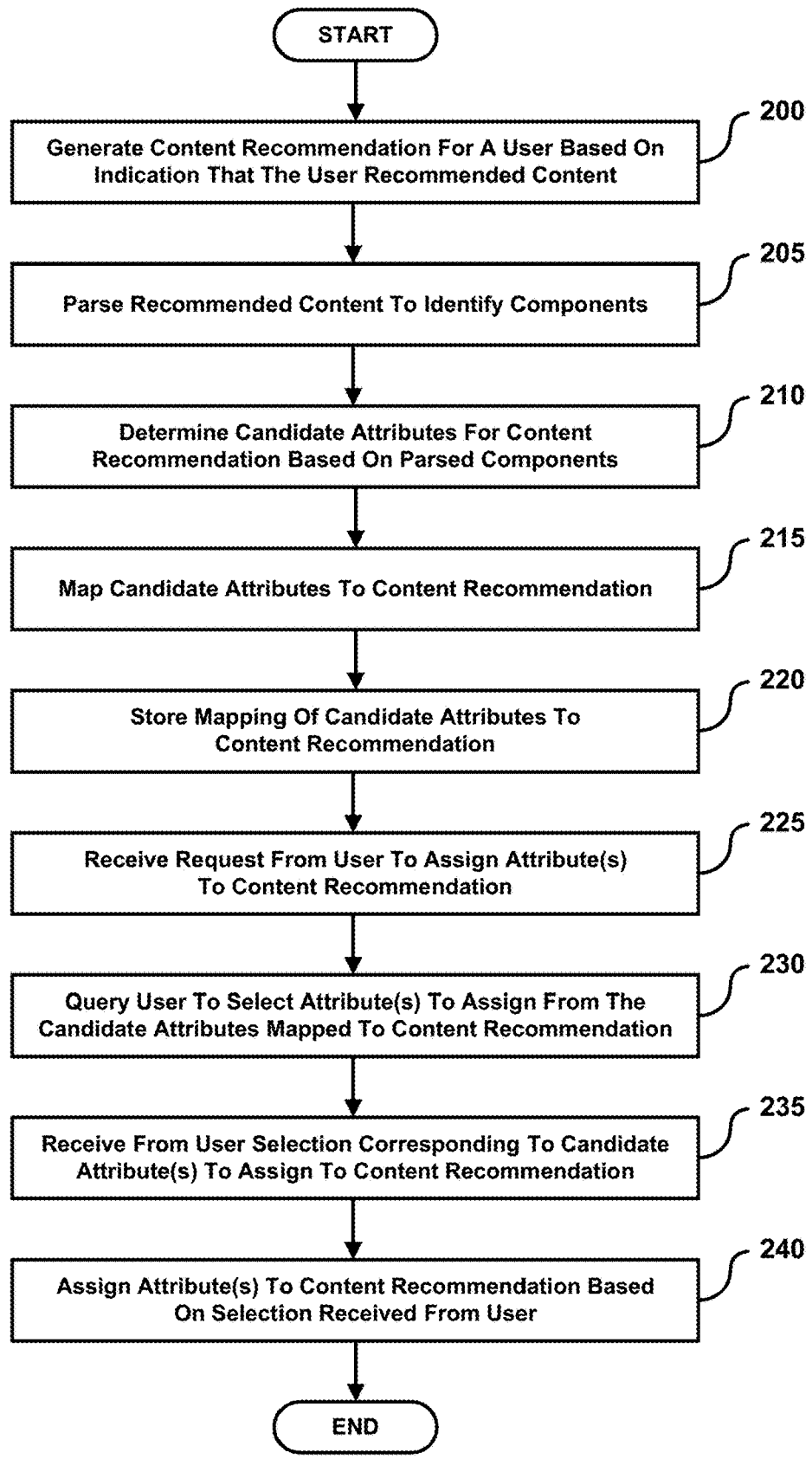
FIG. 2 is a flowchart illustrating an example method for assigning an attribute to a content recommendation made by a user according to one or more embodiments described herein.

FIG. 2 is a flowchart illustrating an example process for determining candidate attributes for a content recommendation made by a user and assigning at least one of the candidate attributes to the content recommendation based on a selection received from the user. In one or more embodiments, when a user recommends a content item (e.g., by selecting or interacting with a user recommendation control (e.g., widget, tool, button, etc.) provided for display to the user in conjunction with the content item), a content recommendation may be generated for that user.

For example, a user viewing content such as a news article may indicate that he or she recommends the news article by selecting a user recommendation control being displayed in conjunction with the news article. The user's indication that he or she recommends the news article may, according to embodiments described herein, generate a "content recommendation" for the user, where the content recommendation may be a visible indication that the user recommends the news article.

Figure 6:
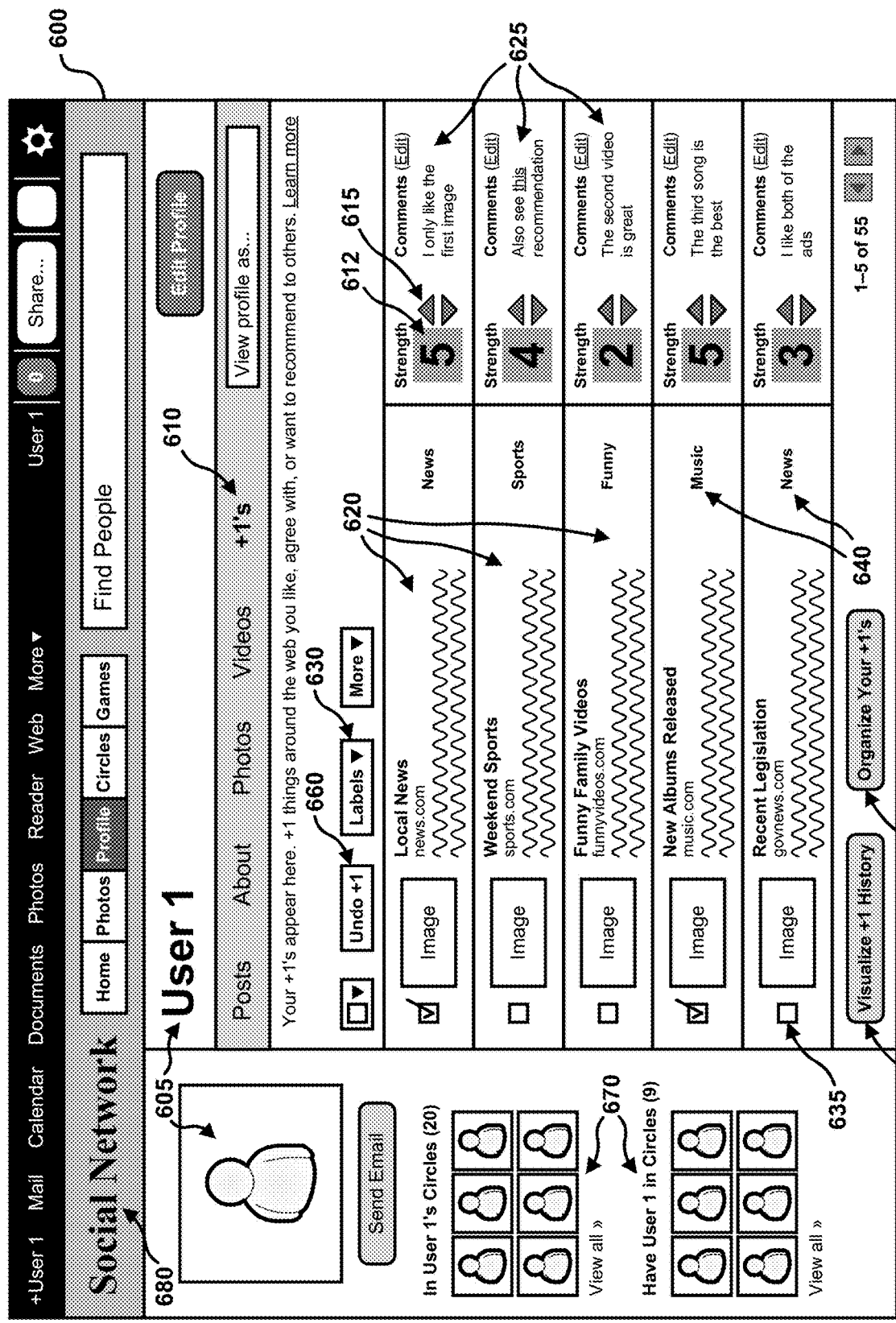
FIG. 6 is an example user interface that includes content recommendations made by a user and also one or more controls for the user to perform actions with or select characteristics for the recommendations according to one or more embodiments described herein.

The illustrative user interface screen shown in FIG. 6 includes one example of what may constitute content recommendations made by a user. Among numerous other features, user interface screen 600 includes content recommendations 620 for user 605 (represented in FIG. 6 as "User 1" for purposes of simplicity). As shown in the user interface screen 600, the content recommendations 620 are for content items that have been recommended by the user 605. Depending on the implementation, the content recommendations 620 may be made available (e.g., published or made visible) to one or more other users (e.g., the user's friends or acquaintances in a social network of the user) in a similar or different form than they appear in the user interface 600. Further details about the example user interface screen 600, as well as various other features shown in FIG. 6 are provided below.

FIGS. 6-9 illustrate example user interfaces, some of which may be used in various embodiments of the disclosure to implement one or more features of the example processes described below with respect to the flowcharts shown in FIGS. 2-5. Various aspects of the example user interface screens shown in FIGS. 6-9 may be referenced in the descriptions of the processes shown in FIGS. 2-5 for purposes of example and/or illustration. As such, the user interfaces shown in FIGS. 6-9 are at least partially described in the following paragraphs with additional details of each user interface screen being provided in the subsequent descriptions of FIGS. 2-5.

As mentioned above, FIGS. 6-9 illustrate example user interface screens including components that may be used in implementing one or more of the various embodiments of the methods and systems described herein. The features and components of the illustrative user interface screens presented in FIGS. 6-9 are described in the context of example content recommendations made by a hypothetical user in a social network, such as content recommendations 620 made by "User 1" 605 in social network 680 as illustrated in user interface screen 600 of FIG. 6. It should be understood that the particular subject-matter of the content contained in any of the example user interface screens of FIGS. 6-9, as well as the arrangement of any of the various components comprising the example user interfaces are for illustrative purposes only, and are not in any way intended to limit the scope of the present disclosure. It should also be noted that numerous other variations, types, combinations, and arrangements of user interface screens may also be used to implement certain features of the methods and systems described herein in addition to or instead of the example user interfaces shown in FIGS. 6-9.

FIG. 6 shows an example user interface screen 600 associated with a social network 680 (e.g., a social content network associated with social network application 150 shown in FIG. 1) of a user 605, where the user interface screen 600 includes numerous components associated with the social network 680, only some of which are described in the context of the present disclosure. In one example scenario, the user interface 600 may be presented to the user 605 (e.g., provided or served, via a network, to a computing device of the user 605 in a format suitable for presentation on (e.g., a display of) the computing device) in response to the user 605 selecting a content recommendations tab 610.

In at least the example user interface 600 illustrated in FIG. 6, the content recommendations tab 610 is represented as a "+1's" symbol (e.g., icon, label, indicator, identifier, etc.) It should be understood that the content recommendations tab 610 may be represented in numerous other ways in addition to or instead of the "+1's" symbol shown in FIG. 6, and that the use of such a symbol is not in any way intended to limit the scope of the disclosure. Furthermore, for purposes of brevity and to avoid confusion, the user 605, the social network 680 of the user, and certain other components included in the user interface screen 600 are not again identified in the example user interfaces shown in FIGS. 7-9 and further described below.

The user interface screen 600 also includes a plurality of content recommendations 620 made by the user 605 (sometimes referred to herein simply as "User 1" for purposes of describing an example). The user interface 600 also includes one or more controls (e.g., widgets, tools, buttons, etc.) that may be configured to allow the user 605 to perform a variety of actions involving the content recommendations 620. For example, according to at least some embodiments the user interface 600 may include one or more recommendation strength controls 615, a recommendation labels control 630, an undo content recommendation control 660 (represented as "Undo+1"), a visualize content recommendation history control 650, and/or an organize content recommendations control 655. These example controls, as well as additional features and components of user interface screen 600 will be further described below.

In at least one embodiment, each of the content recommendations 620 made by the user 605 may be provided for display in user interface 600 in conjunction with a selection box 635. The selection boxes 635 corresponding to the content recommendations 620 may be selected (e.g., as indicated by the check-marks shown in the user interface 600) by the user 605 in order to perform various actions with the selected content recommendations 620.

For example, the user 605 may select one or more content recommendations 620 (e.g., by selecting their respective selection boxes 635) to assign a label 640 using the recommendation labels control 630. While in some arrangements, such as that shown in user interface screen 600, the recommendation labels control 630 may be provided as a drop-down menu, in other arrangements the recommendation labels control 630 may be provided as one of a variety of other similar menu, tab, options, or control types. The one or more content recommendations 620 selected by the user 605 may be assigned labels 640 such as "Music", "News", "Funny", "Sports", as well as numerous other terms or phrases that may be used to categorize, group, identify, or otherwise associate the content recommendations 620. It should be understood that the particular labels 640 assigned to the content recommendations 620 included in user interface screen 600 are entirely illustrative in nature, and are not in any way intended to limit the scope of the disclosure.

Furthermore, depending on the particular implementation, various other terms or phrases may be used to refer to the recommendation labels control 630 and/or the labels 640 without limiting any of the features or capabilities of these components or of any other components with which they interact or are in some relation to as described herein. For example, the labels 640 may instead be referred to as "categories", "tags", "buckets", and/or a variety of other such terms or phrases that carry a meaning similar to "labels". Additionally, the recommendation labels control 630 may be referred to as "recommendation categories control", "recommendation buckets control", etc.

In at least some embodiments of the disclosure, one or more of the labels 640 that may be assigned to the content recommendations 620 (e.g., one or more of the labels 640 made available for selection by the user 605 via the recommendation labels control 630) can be custom-created by the user 605. For example, the user 605 may create one, some or all of the labels 640 available for assignment to the content recommendations 620 based on his or her preferences with regard to organizing the content recommendations 620, his or her interpretation or perspective on the content underlying the recommendations, and the like.

In embodiments where the user 605 is provided with the ability to create custom labels (e.g., one or more of labels 640), the user 605 may also tailor each customized label's availability for assignment to a content recommendation 620. For example, only certain labels 640 may be made available for assignment to a particular content recommendation 620 (e.g., via selection from the recommendation labels control 630) depending on one or more components of the content to which the particular recommendation 620 applies. Accordingly, in addition to providing the user 605 with the ability to create one or more customized labels 640, some embodiments described herein also provide the user 605 with the ability to decide which such customized labels will be made available for selection from the recommendation labels control 630.

Additionally, in some embodiments one or more of the labels 640 available for assignment (e.g., via selection from the recommendation labels control 630) to a particular content recommendation 620 may be provided (e.g., suggested, proposed, etc.) based on what is understood about, or can be determined from, the content to which the particular recommendation is directed. In at least one implementation, the content to which a given content recommendation 620 applies may be parsed (e.g., using components parser 185 shown in the example system of FIG. 1) to identify the various components included in the content.

An example will now be provided to supplement the above descriptions of various features related to providing the user 605 with one or more suggested labels for assigning to a content recommendation 620. For purposes of the present example, reference is made to the content recommendation 620 identified as "Local News" in the example user interface 600.

To assign a label 640 to the "Local News" content recommendation 620 the user 605 may select the selection box 635 associated with the "Local News" content recommendation 620 (e.g., as indicated by the check-mark in the selection box 635) and then select the recommendation labels control 630. In at least the example user interface 600, the recommendation labels control 630 is provided in the form of a drop-down menu containing all of the labels 640 available for the user to select and assign to the "Local News" content recommendation 620. In other arrangements, the recommendation labels control 630 may instead be provided as a separate user interface screen partially or wholly overlaid on user interface 600, as a scrollable menu button, or as any of a variety of other menu or control options known in the art.

Continuing with the above example, according to one or more embodiments described herein, when the user 605 selects the "Local News" content recommendation 620, the content to which the recommendation relates may be parsed (e.g., using the components parser 185 shown in the example system of FIG. 1) to identify various components comprising the content. In one scenario, the "Local News" content recommendation 620 may be directed to a web page (e.g., located at the hypothetical URL "www.news.com") containing one or more news articles, images, videos, ads, and/or various other components, all of which may be parsed out and identified as separable components of the content.

Additionally, in at least one embodiment of the disclosure, the example user interface 600 may also include, for each of the plurality of content recommendations 620 made by the user 605, a recommendation strength 612 along with one or more recommendation strength controls 615. The user 605 may assign a recommendation strength 612 to a given content recommendation 620 to indicate, for example, how strongly the user 605 feels about the particular content recommendation 620. In this manner, the recommendation strength 612 assigned to a content recommendation 620 may also represent or indicate to one or more other users 670 in the social network 680 a level of seriousness to attach or otherwise attribute to the content recommendation 620 made by the user 605. In one example scenario the recommendation strengths 612 that may be assigned to a content recommendation 620 include integers falling within the set $\{-5, -4, \ldots, 0, \ldots 4, 5\}$, where a recommendation strength of "-5" represents a "very weak" recommendation of the relevant content and a recommendation strength of "5" represents a "very strong" recommendation of the content.

In one or more embodiments described herein, the user 605 may change the recommendation strength 612 assigned to the content recommendations 620 by selecting (e.g., interacting with) one or more recommendation strength controls 615 provided in conjunction with each recommendation strength 612. For example, where the user 605 wishes to lower the recommendation strength 612 assigned to a particular content recommendation 620, the user 605 may select the downward-facing portion (e.g., arrow) of the recommendation strength controls 615. In another implementation, the recommendation strength 612 assigned to a content recommendation 620 may be changed by the user 605 directly entering a valid integer (within the set of integers available to represent recommendation strengths 612) into the corresponding portion of user interface 600 where the recommendation strength 612 is found.

It should be understood that the example recommendation strengths 612 shown in the user interface 600, as well as the various explanations provided above with regard to what the recommendations strengths 612 assigned to the content recommendations 620 can represent or indicate to the user 605 and/or to other users 670, are entirely illustrative in nature and not intended to limit the scope of the present disclosure in any way. Instead, the recommendation strengths 612 that a user 605 may assign to his or her content recommendations 620 may be represented in numerous other ways in addition to or instead of the exemplary integers described above. For example, the recommendation strengths 612 may instead be descriptive words (e.g., "strong", "weak", etc.), single letters of the alphabet (e.g., "A", "B", "C", etc.), a variety of symbols or colors, and/or any combination of these or other representations. Additionally, the recommendation strength controls 615 may be provided in one or more other forms within the user interface 600 in addition to or instead of those shown in FIG. 6 and described above.

Furthermore, in some arrangements the example user interface 600 may also include, for each of the content recommendations 620 made by the user 605, one or more comments 625. According to at least one embodiment, the user 605 may add, remove, and/or change one or more comments 625 for a content recommendation 620. The user 605 may add comments 625 to a content recommendation 620 to refine or clarify the recommendation (e.g., "I only like the first image"), to point other users 670 to a particular component of the content related to the recommendation (e.g., "The second video is great"), to direct other users to one or more related content recommendations 620 made by the user 605, and to serve a variety of other similar purposes in-connection with the content recommendation 620.

The example user interface 600 shown in FIG. 6 may also include, in one or more implementations, a visualize content recommendation history control 650 (represented as "Visualize+1 History" in user interface 600), and/or an organize content recommendations control 655 (represented as "Organize Your+1's in user interface 600). Various details about both the visualize content recommendation history control 650 and the organize content recommendations control 655 will be provided below in the context of the example user interface screens illustrated in FIGS. 7-9.

Figure 7:
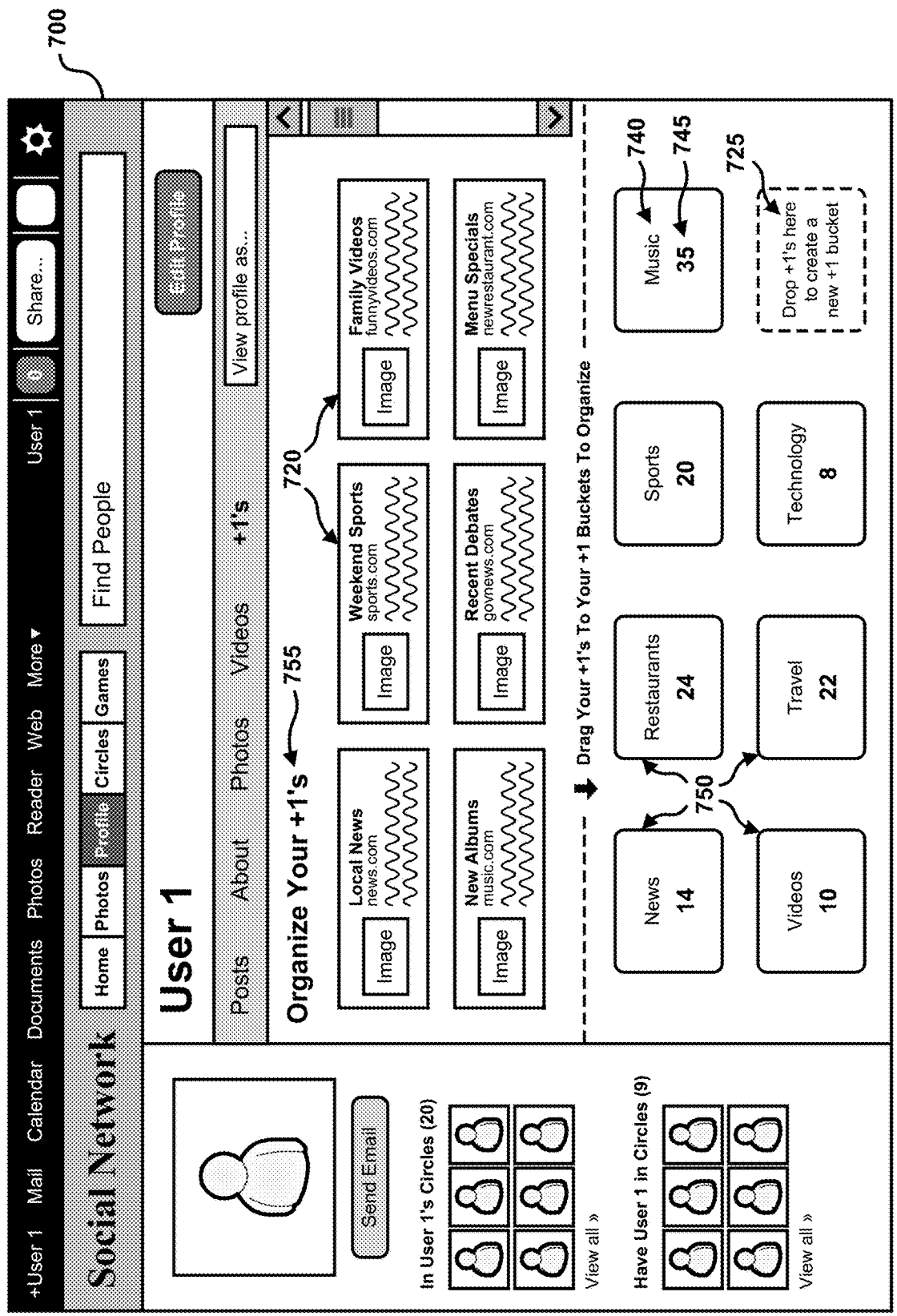
FIG. 7 is an example user interface that includes content recommendations made by a user and also one or more controls for the user to organize the recommendations according to one or more embodiments described herein.

FIG. 7 shows an example user interface screen 700 associated with a social network of a user (e.g., the social network 680 of user 605 as shown in the example user interface 600 of FIG. 6), where the user interface screen 700 includes numerous components associated with allowing a user to organize content recommendations 755 (represented as "Organize Your+1's in user interface 700).

In one example scenario, the user interface screen 700 may be presented to the user (e.g., provided or served, via a network, to a computing device of the user in a format suitable for presentation on (e.g., a display of) the computing device) in response to the user selecting an organize content recommendations control (e.g., the organize content recommendations control 655 included in the example user interface screen 600 shown in FIG. 6). For example, the user interface screen 700 may be presented to a user who wishes to organize and/or categorize his or her content recommendations to make them more easily accessible, searchable, manageable, and the like.

As shown in the user interface screen 700, the user's content recommendations 720 may be dragged (e.g., selected by the user and then moved) into any of a variety of content recommendation buckets 750. It should be understood that the content recommendation buckets 750, which are represented as "+1 Buckets" in the example user interface 700 of FIG. 7, may also be referred to as "content recommendation groups", "content recommendation categories", "content recommendation associations", and/or numerous other terms or phrases similar in meaning. The phrases "content recommendation buckets" and "+1 Buckets" are exemplary in nature and are not in any way intended to limit the scope of the present disclosure.

In at least the example user interface screen 700, each of the content recommendation buckets 750 may include a label 740 and/or a count 745 relevant or applicable to the content recommendations 720 associated therewith.

The labels 740 shown on the content recommendation buckets 750 may be terms and/or phrases indicative of a category, group, identity, or common association relevant to the content recommendations contained therein. For example, the content recommendation buckets 750 may include labels 740 such as "News", "Restaurants", "Sports", "Music", "Videos", "Travel", "Technology", as well as a variety of other such terms descriptive of the content to which the content recommendations contained in the bucket apply. In at least one embodiment, the labels 740 shown on the content recommendation buckets 750 in FIG. 7 may be similar to the labels 640 assigned to the content recommendations 620 as shown in the example user interface 600 of FIG. 6. Further, as mentioned above with respect to FIG. 6, it should also be understood that the particular labels 740 assigned to the content recommendation buckets 750 included in user interface screen 700 are entirely illustrative in nature, and are not in any way intended to limit the scope of the disclosure.

Additionally, the count 745 shown on a content recommendation bucket 750 may indicate the number or quantity of content recommendations 720 contained in (e.g., associated with) that particular content recommendation bucket 750. For example, the "News" content recommendation bucket 750 is displayed with a count of "14", indicating fourteen content recommendations 720 have been placed/grouped in the "News" recommendation bucket 750.

In at least one embodiment, a content recommendation 720 may be placed or grouped in one or more content recommendation buckets 750 by the user (e.g., by the user selecting and dragging the content recommendation 720 to the desired content recommendation buckets 750). In one or more other embodiments, a content recommendation 720 may be automatically placed or grouped in one or more relevant content recommendation buckets 750 based on a determination of the content to which the content recommendation 720 applies. In still another embodiment, the user may be queried as to which, if any, of the content recommendation buckets 750, a particular content recommendation 720 should be associated. Further, depending on the implementation, a particular content recommendation 720 may be associated with only one of the content recommendation buckets 750 at any given time, or may be associated with multiple content recommendation buckets at any given time.

In at least some embodiments of the disclosure, the user may create one or more a new content recommendation buckets. For example, in at least the embodiment shown in FIG. 7, the user may create a new content recommendation bucket by dragging and dropping (e.g., selecting and moving) one or more of the content recommendations 720 to new content recommendation bucket area 725, represented in FIG. 7 by broken lines to distinguish it from the existing content recommendation buckets 750. In a scenario where the user moves (e.g., drags and drops) one of the content recommendations 720 to the new content recommendation bucket area, the user may be queried for a label 740 to assign to the newly-created content recommendation bucket.

Where a user is queried for a label 740 to assign to a newly-created content recommendation bucket 750, such a query may consist of a request for the user to enter a label for the bucket, or select from among a group or list of labels available to assign to the bucket, or some combination thereof. In embodiments where the user is queried to select from available labels to assign to the content recommendation bucket 750, some or all of the labels available for selection may be based on the user's indicated preferences with regard to organizing his or her content recommendations 720, the user's actions or selections with regard to previously created content recommendation buckets 750, and the like.

Furthermore, in embodiments where the user is provided with the option to create custom labels (e.g., one or more of labels 740) for the content recommendation buckets 750, the user may also set one or more preferences for the number (e.g., the count 745) of content recommendations 720 that can be placed in the content recommendation buckets 750. For example, the user may establish (e.g., by selecting an option or changing a setting) that a given content recommendation bucket 750 may only be associated with a certain number of content recommendations 720, such that no more content recommendations can be added to the content recommendation bucket 750 once the count 745 for the bucket reaches a threshold number (e.g., 20, 30, 50, etc.). Among other advantages, this option may help the user actively manage his or her content recommendations so as to ensure that older content recommendations are periodically updated, removed, re-assigned to different buckets, etc., and more recent content recommendations are taken into consideration for purposes of the user's content recommendation history. Further details regarding the user's content recommendation history will be provided below with respect to the example user interfaces shown in FIGS. 8 and 9.

Figure 8:
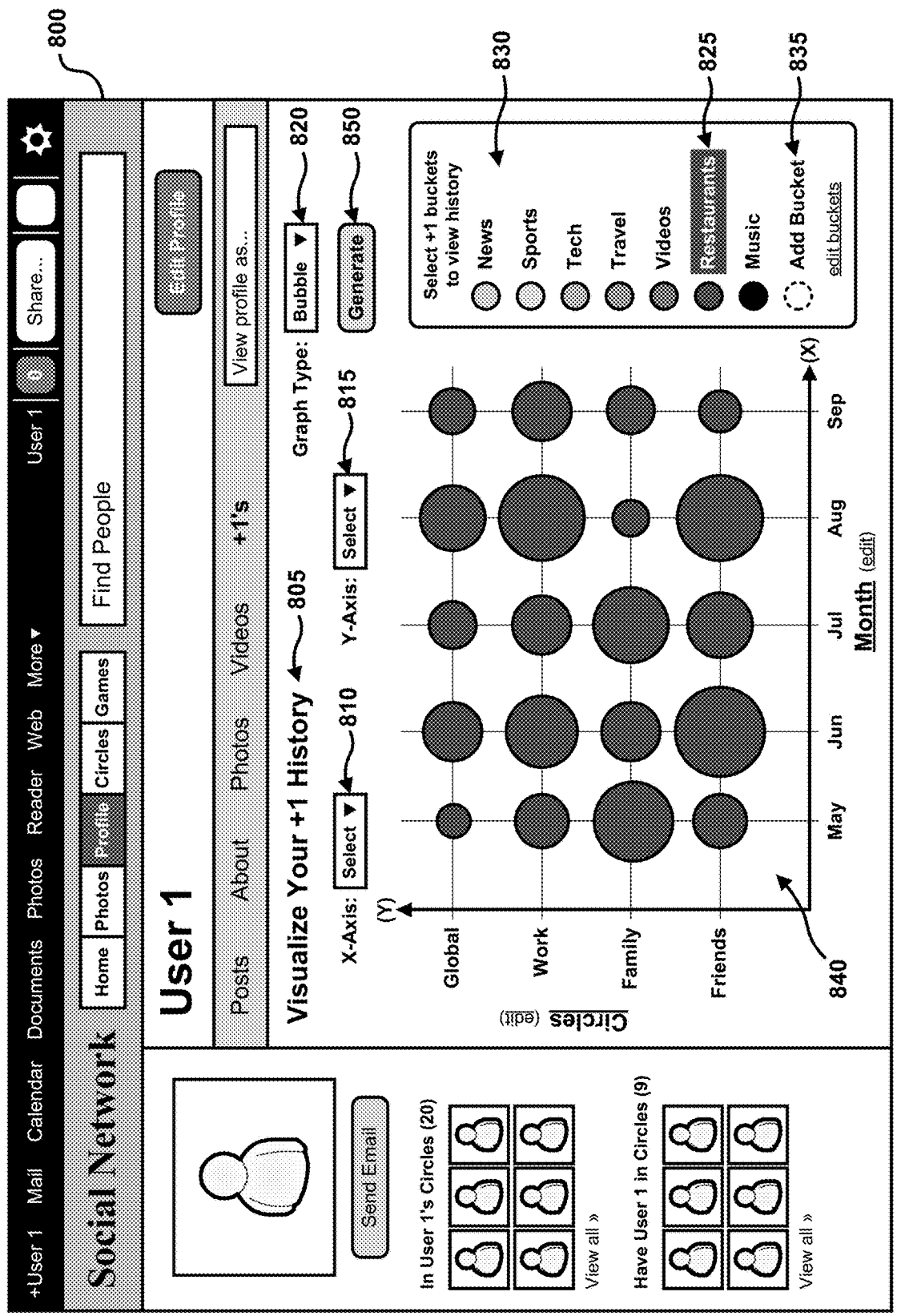
FIG. 8 is an example user interface that includes a graphical representation of a content recommendation history for a user according to one or more embodiments described herein.

FIG. 8 shows an example user interface screen 800 associated with a social network of a user (e.g., the social network 680 of user 605 as shown in the example user interface 600 of FIG. 6), where the user interface screen 800 includes numerous components associated with allowing a user to visualize their content recommendation history 805 (represented as "Visualize Your+1 History" in user interface 800).

In an example scenario, the user interface screen 800 may be presented to the user (e.g., provided or served, via a network, to a computing device of the user in a format suitable for presentation on (e.g., a display of) the computing device) in response to the user selecting a visualize content recommendation history control (e.g., the visualize content recommendation history control 650 included in the example user interface screen 600 shown in FIG. 6). For example, the user interface screen 800 may be presented to a user who wishes to view their content recommendations over a period or interval of time. In another example, the user interface screen 800 may be presented to a user who wishes to visualize how their content recommendations compare to those made by one or more other individuals in the user's social network (e.g., the user's friends, acquaintances, other users within a certain geographical area, etc.).

The user interface screen 800 includes a content recommendation history 840 for the user along with various components that allow the user to select (e.g., choose, identify, determine, edit, etc.) specific content recommendations or groups of content recommendations to be included in (e.g., used to generate) the content recommendation history 840, and also customize various display properties that determine the appearance and display of the content recommendation history 840 in the user interface 800. In the example user interface screen 800, the user's content recommendation history 840 is displayed as a graphical representation (e.g., as a bubble graph) and also included are several components in the form of drop-down menus that may be configured to allow the user to make selections for various aspects of the graphical representation. These illustrative components include x-axis control 810, y-axis control 815, graph type control 820, and generate history control 850.

In at least one embodiment, the x-axis control 810 allows the user to select a variable to assign to the x-axis of the graphical representation of the user's content recommendation history 840, and the y-axis control 815 allows the user to select a variable to assign to the y-axis. For example, the variable assigned to the x-axis may be a specified period of time (e.g., July 2011, June 2011 through August 2011, etc.) or particular intervals of time (e.g., each week of the previous three months) over which the user wishes to view his or her content recommendations. Similarly, the variable assigned to the y-axis (e.g., by the user selecting one of a variety of available options from the y-axis control 815) may be, for example, a single individual or a group or population of individuals in the user's social network (e.g., social network 680 of user 605 included in the example user interface 600 as shown in FIG. 6) whose content recommendations the user wishes to incorporate in the content recommendation history 840 for purposes of comparison.

The user interface screen 800 may also include a content recommendations selection menu 830, from which the user may select one or more groups or categories of content recommendations 825 to be used for generating the recommendation history (e.g., to be used as the data comprising the recommendation history). In at least one embodiment, the content recommendations selection menu 830 may include an add group option 835, whereby the user may select a group of content recommendations other than those shown in the content recommendations selection menu 830 to include in the recommendation history.

The graph type control 820 allows the user to select a format in which the content recommendation history 840 is to be presented in the user interface screen 800. In one embodiment, such as that shown in example user interface screen 800, a "bubble" graph type may be selected from the graph type control 820. In another embodiment, such as that shown in example user interface screen 900 of FIG. 9 (described in greater detail below), a "line" graph type may be selected from the graph type control (e.g., graph type control 920 in FIG. 9). It is to be understood that numerous other forms of graphical representations or graph types may similarly be selected from the graph type control 820 (and/or graph type control 920 as shown in FIG. 9) in addition to or instead of those described above.

While in some arrangements, such as that shown in the user interface screen 800, the x-axis control 810, y-axis control 815, and graph type control 820 are provided as drop-down menus, in other arrangements these controls may be provided as one of a variety of other similar menus, tabs, options, or control types. Furthermore, although the example user interfaces shown in FIGS. 8 and 9 include graphical representations of a user's content recommendation history (e.g., content recommendation histories 840 and 940 in FIGS. 8 and 9, respectively), it should be understood that a user's content recommendation history may also be visualized in numerous other formats and/or arrangements in addition to or instead of those shown.

For example, the user's content recommendation history may be visualized as a timeline of events or a flowchart of discrete occurrences (e.g., content recommendations made by the user). In another example, the user's content recommendation history may be viewed as a pie chart or in a table format. The graphical representations of the user's content recommendation history as shown in FIGS. 8 and 9 is for illustrative purposes only, and is not in any way intended to limit the scope of the present disclosure.

Figure 9:
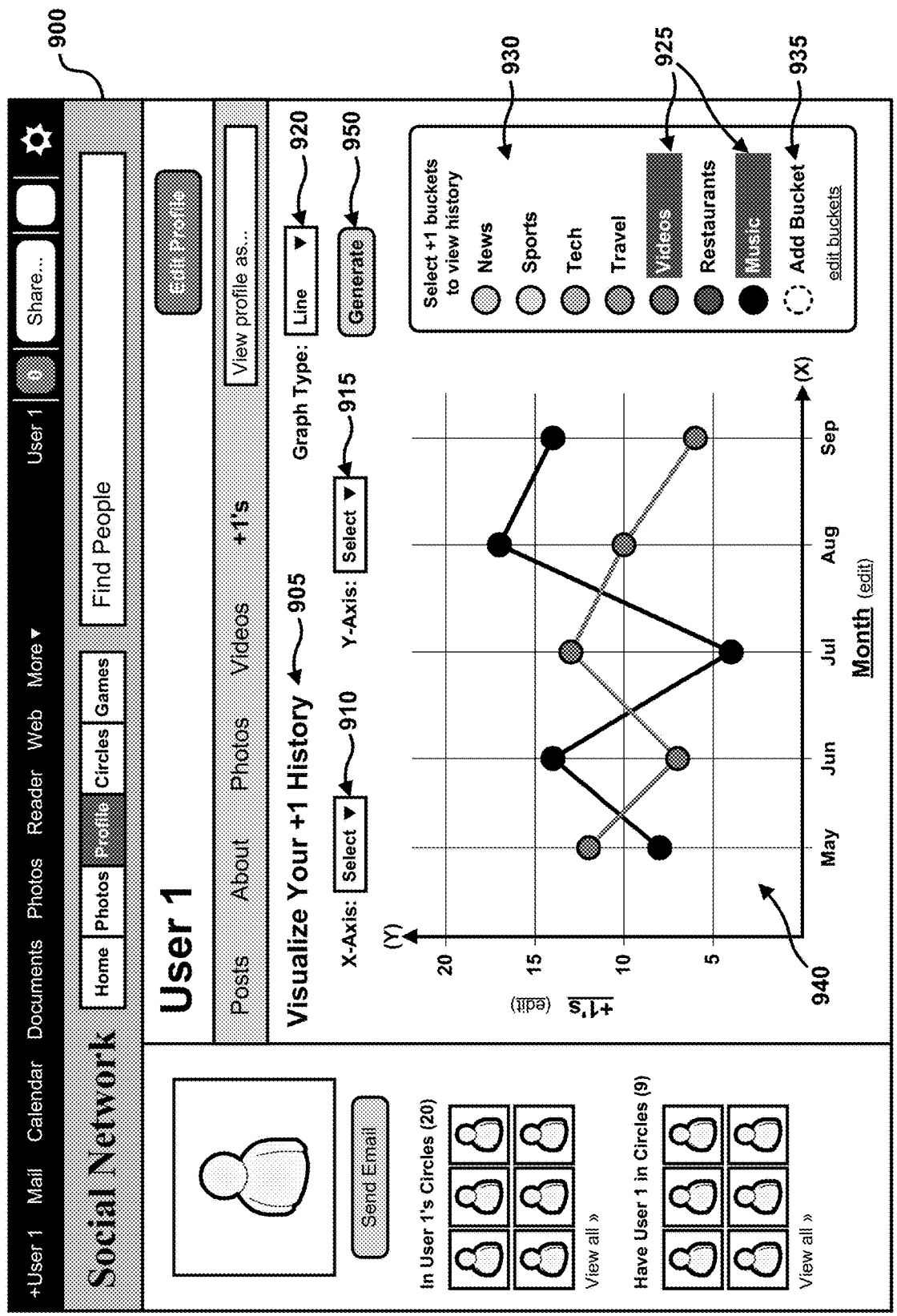
FIG. 9 is an example user interface that includes a graphical representation of a content recommendation history for a user according to one or more embodiments described herein.

FIG. 9 shows another example user interface screen 900 associated with a social network of a user (e.g., the social network 680 of user 605 as shown in the example user interface 600 of FIG. 6), where the user interface screen 900 includes various components configured for allowing a user to visualize their content recommendation history 905 (represented as "Visualize Your+1 History" in user interface 800). The example user interface 900 includes many of the same or similar components as those included in the user interface 800 shown in FIG. 8 and described above. Therefore, for purposes of brevity, various components included in the user interface screen 900 that also appear in the user interface screen 800 will not again be described in detail in the context of FIG. 9.

Referring back to the flowchart shown in FIG. 2, the process illustrated begins at step 200 where a content recommendation is generated for a user based on an indication that the user recommended content. In at least one embodiment, the indication that the user recommended content may be received (e.g., at social network application server 115 as shown in FIG. 1) as a result of the user selecting or interacting with a user recommendation control (e.g., widget, tool, button, etc.) provided for display to the user in conjunction with the content that was recommended, as described above.

Once an indication has been received that the user recommended content, the process goes to step 205 where the recommended content may be parsed (e.g., using components parser 185 as shown in FIG. 1) to identify components of the content. For example, the recommended content may be parsed using one or more conventional parsing techniques, such as implementing a web crawler or other similar automated computer program capable of scanning, reading or "crawling" content comprising a web page or advertisement.

The process moves from parsing the recommended content in step 205 to using the components identified from the parsing as a basis for determining candidate attributes for the corresponding content recommendation in step 210. For example, suppose a user recommends a web page and the web page is parsed to identify components that include a listing of new music releases, a preview of an audio (e.g., song) file, an image of an album cover, a music video clip, and reviews of recent concerts. With these parsed components, examples of candidate attributes for the content recommendation that is generated may include "Music", "Reviews", or "Videos" as a possible category of the content recommendation, "3", "4", or "5" as a possible strength of the content recommendation (e.g., where it can be determined from previous content recommendations made by the user, and/or other available data about the user, that the user feels a particular way about this type of content), as well as various other relevant characteristics or qualities associated with the content.

In step 215 the candidate attributes determined in step 210 may be mapped to the content recommendation and then this mapping may be stored for the content recommendation in step 220. In at least one embodiment, the candidate attributes determined for the content recommendation may be mapped and stored by an attributes module (e.g., attributes module 192 of social network application server 115 as shown in FIG. 1) for later reference and/or retrieval, such as in step 230 of the process, which is further described below.

In step 225 a request is received from the user to assign an attribute to the content recommendation generated in step 200. In one or more embodiments, the request received from the user in step 225 may include the user selecting the content recommendation presented to the user in a user interface screen. For example, with reference to the user interface screen 600 shown in FIG. 6, the user may request to assign an attribute to a content recommendation by selecting the corresponding selection box 635.

The process then continues to step 230 where, in response to receiving the request from the user in step 225, the user is queried to select one or more attributes to assign to the content recommendation from the candidate attributes mapped and stored for the content recommendation in steps 215 and 220 of the process. In at least one embodiment, querying the user to select an attribute to assign to the content recommendation in step 230 may include modifying one or more controls included in a user interface screen presented to the user (e.g., one or more of the controls included in user interface screen 600 as shown in FIG. 6).

For example, referring to the user interface screen 600 of FIG. 6, in response to the user selecting the selection box 635 corresponding to the content recommendation (which in some embodiments represents the step of receiving a request from the user to assign an attribute to the content recommendation (e.g., step 225)), one or more of the controls included in user interface screen 600, or the available actions/options associated with the controls, may be modified (e.g., removed, locked, substantiated, etc.). In at least some embodiments, modifying the controls, or the actions/options associated with the controls, included in user interface 600 represents querying the user in step 230 of the process. For example, in response to the user selecting the selection box 635 corresponding to the content recommendation, one or more of the recommendation strength controls 615, recommendation labels control 630, undo content recommendation control 660, etc., may be modified based on the candidate attributes mapped to the content recommendation.

In step 235, a selection corresponding to one or more of the candidate attributes to assign to the content recommendation is received from the user. For example, in the context of FIG. 6, after selecting the selection box 635 corresponding to the content recommendation, the user may select a label to assign to the content recommendation (e.g., by using the recommendation labels control 630), where the label is selected from a group of labels available for assignment to the particular content recommendation (e.g., candidate labels, which are one example of candidate attributes). The process then moves to step 240 where one or more attributes are assigned to the content recommendation based on the selection received from the user in step 235. For example, the content recommendation may be assigned the label selected by the user from the recommendation labels control 630.

Figure 3:
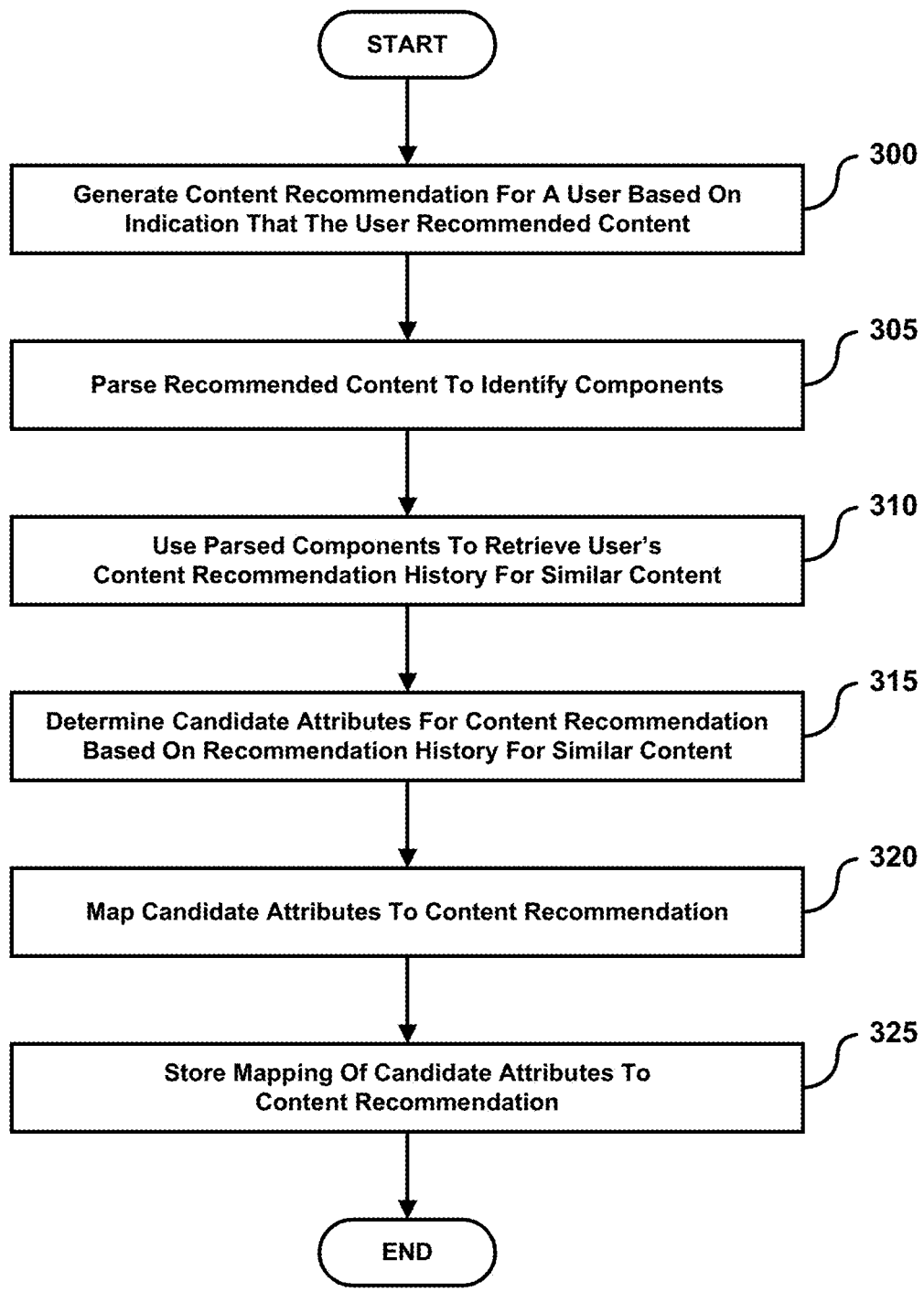
FIG. 3 is a flowchart illustrating an example method for determining candidate attributes to assign to a content recommendation made by a user based on a recommendation history of the user according to one or more embodiments described herein.

FIG. 3 is a flowchart illustrating an example process for determining candidate attributes to assign to a content recommendation made by a user based on a recommendation history of the user. In accordance with one or more embodiments, steps 300 and 305 of the example process illustrated in FIG. 3 may correspond to steps 200 and 205, respectively, as shown in FIG. 2 and described above. Therefore, for purposes of brevity, the generating of a content recommendation in response to receiving an indication that a user recommended content in step 300 and then the parsing of the recommended content to identify components of the content in step 305 will not be further described in the context of FIG. 3.

In step 310 of the process, the parsed components may be used to retrieve (e.g., receive, obtain, request, etc.) the user's content recommendation history for content similar to the content for which a recommendation indication was received in step 300. For example, the parsed components of the recommended content may be compared to components parsed from previous content recommended by the user, which may be stored, for example, in one or more content component databases (e.g., content database 195 and/or web index 190 as shown in FIG. 1). Based on such a comparison of parsed components, content similar to the recommended content may be identified. The user's content recommendation history for such similar content may then be retrieved and used in step 315 as described below.

In step 315, the user's content recommendation history for similar content may be used to determine candidate attributes for the content recommendation generated in step 300. The process then continues through steps 320 and 325 in a manner similar to the mapping and storing steps (e.g., steps 215 and 220, respectively) of the process illustrated in FIG. 2, which is described in detail above.

Figure 4:
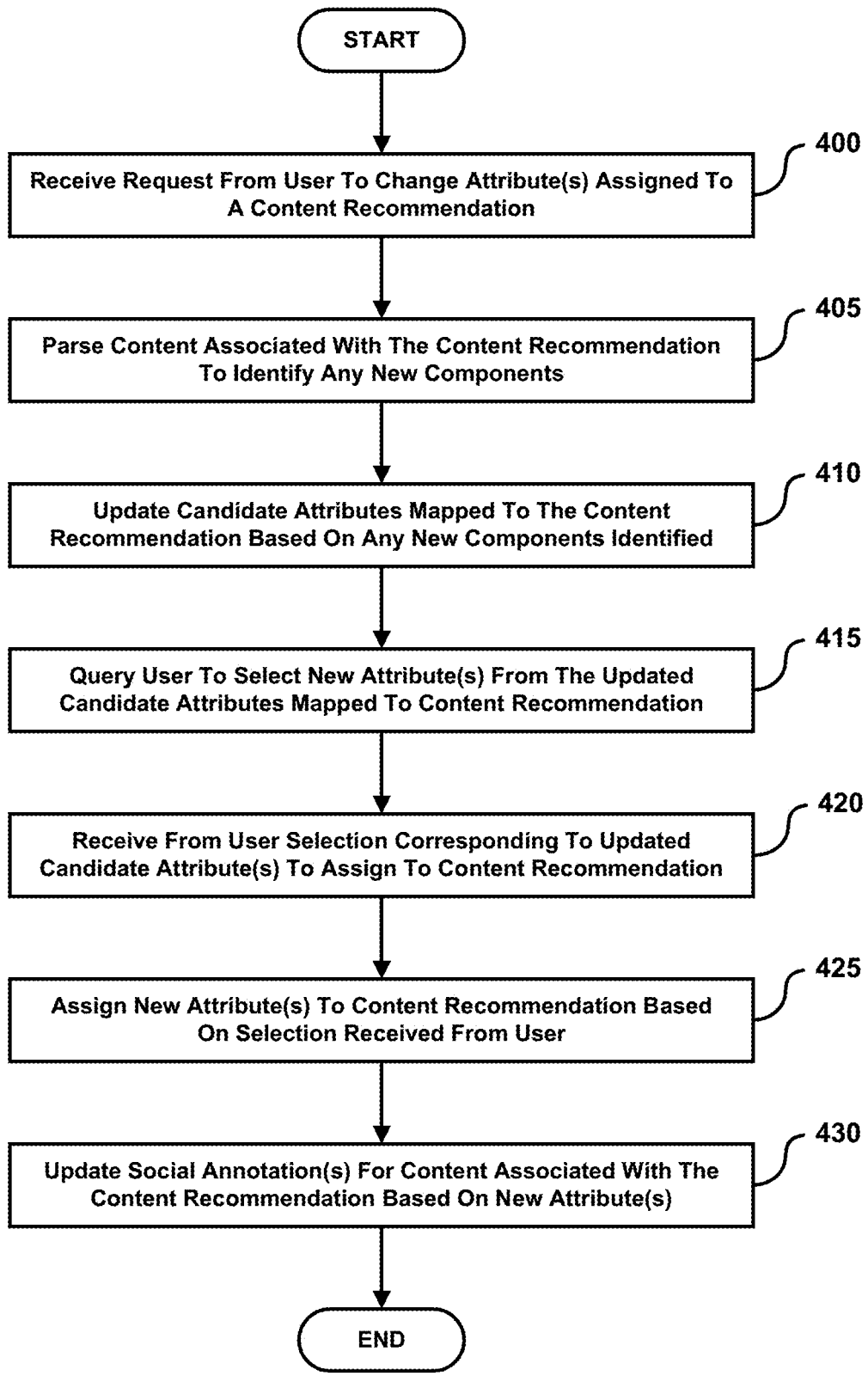
FIG. 4 is a flowchart illustrating an example method for updating attributes assigned to a content recommendation made by a user and generating social content based on the updated attributes according to one or more embodiments described herein.

FIG. 4 is a flowchart illustrating an example process for determining one or more attributes assigned to a content recommendation made by a user, and generating social content (e.g., social annotations) based on the one or more assigned attributes. The process begins in step 400 where a request is received from a user to change one or more attributes assigned to a content recommendation of the user. In step 405, the content associated with the content recommendation is parsed to identify or determine any new components of the content. For example, the content associated with the content recommendation may have been updated (e.g., with new components added, old components removed, and/or various components changed) from the time when the user recommended the content.

The process then moves to step 410 where the candidate attributes mapped to the content recommendation may be updated based on any new components identified from parsing the associated content in step 405. In step 415, the user may be queried to select one or more new attributes, from the updated candidate attributes mapped to the content recommendation. In step 420, a selection may be received from the user, where the selection corresponds to updated candidate attributes to assign to the content recommendation. In step 425 of the process, one or more new attributes may be assigned to the content recommendation based on the selection received from the user in step 420. In step 425, one or more social annotations may be updated based on the new attributes assigned, where the social annotations are for (e.g., apply to) the content associated with the content recommendation.

Figure 5:
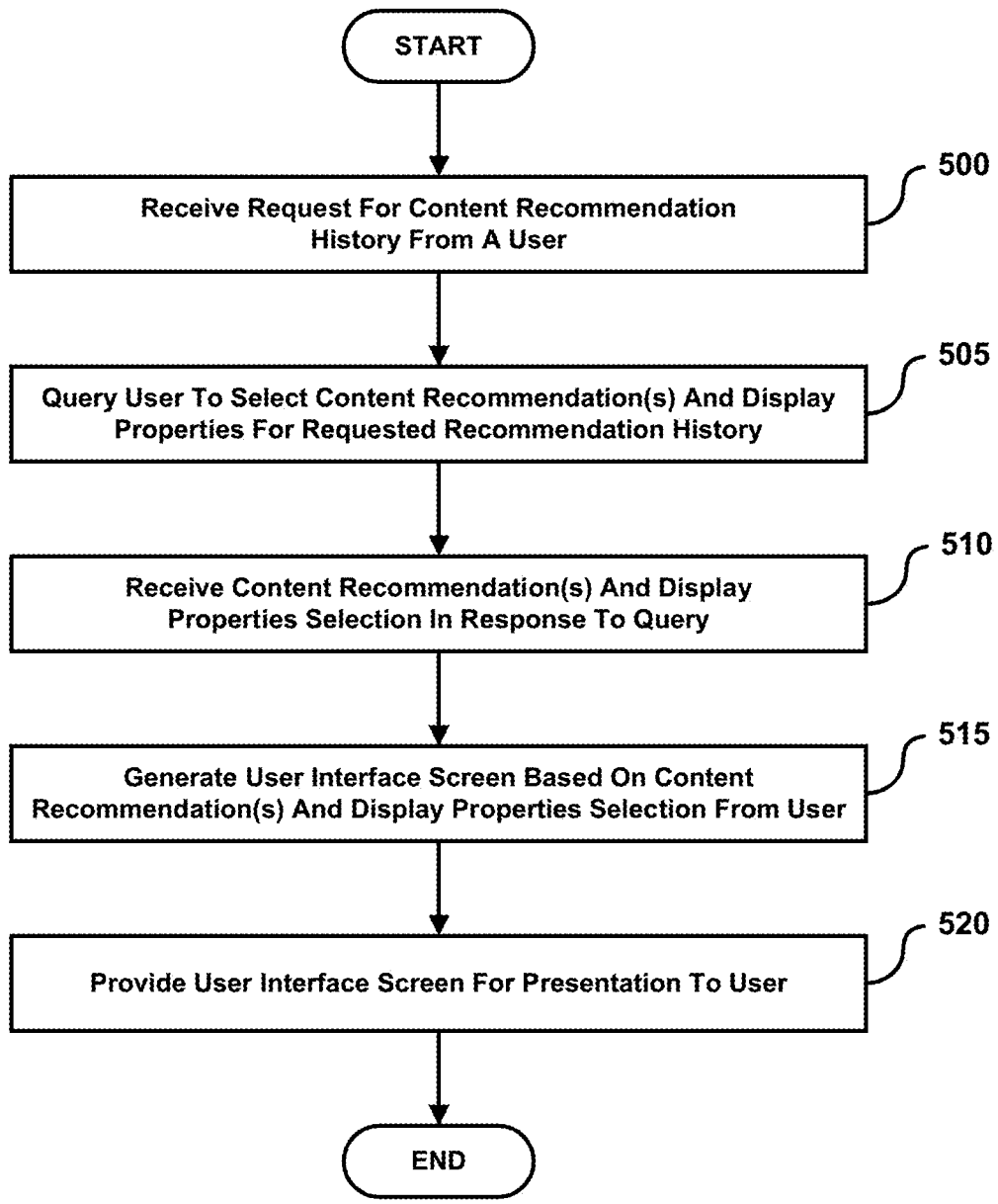
FIG. 5 is a flowchart illustrating an example method for generating a content recommendation history for a user and providing the content recommendation history for presentation to the user according to one or more embodiments described herein.

FIG. 5 is a flowchart illustrating an example process for providing a visual representation of content recommendations made by a user. As with the above descriptions of the processes shown in FIGS. 2-4, the following description of the process shown in FIG. 5 also makes references to the example user interfaces shown in FIGS. 6-9 for purposes of providing additional explanation by way of illustration. It should again be noted that while various features of the example user interfaces shown in FIGS. 6-9 are described in the context of the process shown in FIG. 5, each of these user interfaces is also described in further detail in the paragraphs above.

The process of FIG. 5 begins at step 500 where a request for a content recommendation history is received from a user (e.g., recommendation history request 134 received at social network application server 115 from user device 105 as shown in FIG. 1). Referring to the example user interface 600 shown in FIG. 6, a user may make a request for his or her content recommendation history by selecting a control (e.g., button, tool, widget, etc.) 650 displayed in conjunction with the user's content recommendations 620. In the example user interface 600, such a content recommendation history control is represented as a "Visualize+1 History" 650 control.

After receiving the request for a content recommendation history in step 500, the process moves to step 505 where the user may be queried to select one or more content recommendations and/or display properties for use in generating the requested recommendation history. In at least one embodiment the user may be queried in step 505 by presenting the user with one of the example user interfaces 800 or 900 shown in FIGS. 8 and 9, respectively.

For example, upon selecting the Visualize+1 History control 650, which in at least one embodiment may constitute step 500 of the process where a request is received from the user for his or her content recommendation history, the user may be presented with either of the example user interfaces 800 or 900. With reference to the example user interface 800, the queries made to the user in step 505 may be in the form of drop-down menus from which the user can select various graphical display properties (e.g., options, choices, preferences, etc.) such as graph type 820, data type for the x-axis 810, data type for the y-axis 815, and the like, for use in generating the requested recommendation history. In another example, the queries made to the user in step 505 may be in the form of a content recommendations selection menu 830, from which the user may select one or more groups or categories of content recommendations 825 to be used as the data comprising the recommendation history.

Figure 10:
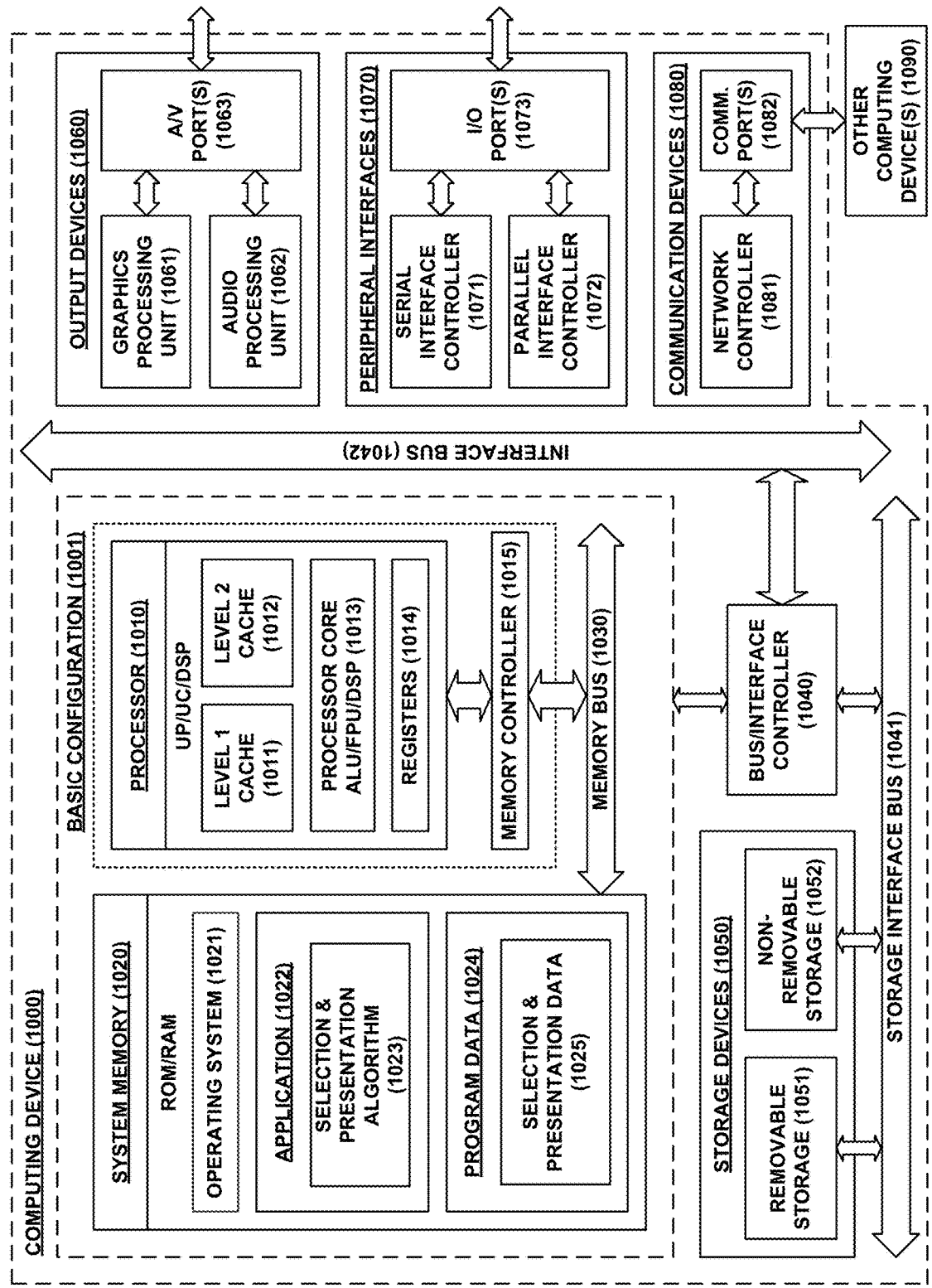
FIG. 10 is a block diagram illustrating an example computing device arranged for selecting and presenting content according to one or more embodiments described herein.

FIG. 10 is a block diagram illustrating an example computing device 1000 that is arranged for selecting and presenting an item of content (e.g., a web page, an advertisement, etc.) to a user or user device in accordance with one or more embodiments of the present disclosure. In a very basic configuration 1001, computing device 1000 typically includes one or more processors 1010 and system memory 1020. A memory bus 1030 may be used for communicating between the processor 1010 and the system memory 1020.

Depending on the desired configuration, processor 1010 can be of any type including but not limited to a microprocessor (μP), a microcontroller (μC), a digital signal processor (DSP), or any combination thereof. Processor 1010 may include one or more levels of caching, such as a level one cache 1011 and a level two cache 1012, a processor core 1013, and registers 1014. The processor core 1013 may include an arithmetic logic unit (ALU), a floating point unit (FPU), a digital signal processing core (DSP Core), or any combination thereof. A memory controller 1015 can also be used with the processor 1010, or in some embodiments the memory controller 1015 can be an internal part of the processor 1010.

Depending on the desired configuration, the system memory 1020 can be of any type including but not limited to volatile memory (e.g., RAM), non-volatile memory (e.g., ROM, flash memory, etc.) or any combination thereof. System memory 1020 typically includes an operating system 1021, one or more applications 1022, and program data 1024. In at least some embodiments, application 1022 includes a selection and presentation algorithm 1023 that is configured to select a content item, and provide that content item to a user device for presentation to a user. The selection and presentation algorithm is further arranged to identify annotations (e.g., content associated with a social network of a user) for presentation to a user along with the selected content item.

Program Data 1024 may include selection and presentation data 1025. In some embodiments, application 1022 can be arranged to operate with program data 1024 on an operating system 1021 such that a request made by a user of a user device (e.g., user device 105 shown in FIG. 1) is routed via a social network application (e.g., social network application 150 shown in FIG. 1), which acts as a proxy for transmitting such requests to an appropriate server.

Computing device 1000 can have additional features and/or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of computing device 1000.

Computing device 1000 can also include an interface bus 1042 for facilitating communication from various interface devices (e.g., output interfaces, peripheral interfaces, communication interfaces, etc.) to the basic configuration 1001 via the bus/interface controller 1040. Example output devices 1060 include a graphics processing unit 1061 and an audio processing unit 1062, either or both of which can be configured to communicate to various external devices such as a display or speakers via one or more A/V ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication device 1080 includes a network controller 1081, which can be arranged to facilitate communications with one or more other computing devices 1090 over a network communication (not shown) via one or more communication ports 1082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency trade-offs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
   identifying, by a server, a user content recommendation made by a user through interaction with a user interface, the user content recommendation being a recommendation of content by the user;
   identifying subject matter of one or more components in the recommended content;
   determining that the identified subject matter of the one or more components in the recommended content match subject matter of one or more components of previous content recommendations that have been previously made by the user based on a comparison of attributes of the one or more components in the recommended content and attributes of the one or more components of the previous content recommendations;
   providing, for display at a computing device, a candidate attribute that is eligible to be assigned to the user content recommendation based on the match between the subject matter of the one or more components of the previous content recommendations and the subject matter of the one or more components in the recommended content;
   providing, for display with the candidate attribute at the computing device, a strength score element that enables the user to assign an indication of a strength of the user's recommendation of the recommended content;
   receiving a selection of the candidate attribute and a selection of a strength score for the indication of the strength of the user's recommendation of the recommended content, wherein the selection of the candidate attribute is received in response to user interaction with a selection control corresponding to the candidate attribute at the computing device;
   assigning the candidate attribute to the user content recommendation based on the received selection of the candidate attribute; and
   serving, via a network, a user interface screen to the computing device in a format suitable for presentation on the computing device, the user interface screen identifying the user content recommendation, the strength score, and the candidate attribute assigned to the user content recommendation by the user.

2. The method of claim 1, wherein determining that subject matter of the one or more components in the recommended content match subject matter of the one or more components of the previous content recommendations comprises:
   parsing the recommended content to identify the one or more components of the recommended content;
   comparing the parsed one or more components to the one or more components of the previous content recommendations; and
   determining that the match exists based on the comparison.

3. The method of claim 2, further comprising:
   identifying attributes of the recommended content using the parsed one or more components of the recommended content; and
   retrieving attributes of previous content recommendations made by the user, wherein comparing the parsed one or more components to the one or more components of previous content recommendation comprises comparing the identified attributes of the recommended content to attributes of the previously recommended content made by the user to identify a subject matter match.

4. The method of claim 1, wherein assigning the candidate attribute to the user content recommendation comprises:
mapping the candidate attribute to the user content recommendation; and
storing the mapping of the candidate attribute to the user content recommendation in a data storage device.

5. The method of claim 4, wherein providing the candidate attribute that is eligible to be assigned to the user content recommendation includes retrieving the stored candidate attribute using the stored mapping to the user content recommendation.

6. The method of claim 1, further comprising:
in response to identifying the user content recommendation:
parsing the recommended content to identify the one or more components of the recommended content; and
determining a candidate attribute for the recommended content based on subject matter of content in the one or more components of the recommended content.

7. The method of claim 6, wherein assigning the candidate attribute to the user content recommendation comprises:
mapping the candidate attribute to the user content recommendation; and
storing the mapping of the candidate attribute to the user content recommendation.

8. The method of claim 7, further comprising retrieving the stored candidate attribute using the stored mapping to the user content recommendation prior to the serving.

9. The method of claim 8, further comprising modifying presentation of the user interface indicating the selection of the candidate attribute in response to the user interaction with the selection control.

10. The method of claim 1, wherein assigning the candidate attribute comprises assigning, to the user content recommendation one or both of a category for the user content recommendation and a strength for the user content recommendation.

11. A system for identifying a component of content recommended by a user, the system comprising:
at least one processor; and
a computer-readable medium coupled to the at least one processor having instructions stored thereon which, when executed by the at least one processor, causes the at least one processor to:
identify a user content recommendation made by a user through interaction with a user interface, the user content recommendation being a recommendation of content by the user;
identify subject matter of one or more components in the recommended content;
determine that the identified subject matter of the one or more components in the recommended content match subject matter of one or more components of previous content recommendations that have been previously made by the user based on a comparison of attributes of the one or more components in the recommended content and attributes of the one or more components of the previous content recommendations;
provide, for display at a computing device, a candidate attribute that is eligible to be assigned to the user content recommendation based on the match between the subject matter of the one or more components of the previous content recommendations and the subject matter of the one or more components in the recommended content;
provide, for display with the candidate attribute at the computing device, a strength score element that enables the user to assign an indication of a strength of the user's recommendation of the recommended content;
receive a selection of the candidate attribute and a selection of a strength score for the indication of the strength of the user's recommendation of the recommended content, wherein the selection of the candidate attribute is received in response to user interaction with a selection control corresponding to the candidate attribute at the computing device;
assign the candidate attribute to the user content recommendation based on the received selection of the candidate attribute; and
serve, via a network, a user interface screen to the computing device in a format suitable for presentation on the computing device, the user interface screen identifying the user content recommendation, the strength score, and the candidate attribute assigned to the user content recommendation by the user.

12. The system of claim 11, wherein determining that subject matter of the one or more components in the recommended content match subject matter of previous content recommendations comprises:
parsing the recommended content to identify the one or more components of the recommended content;
comparing the parsed one or more components to the one or more components of the previous content recommendations; and
determining that the match exists based on the comparison.

13. The system of claim 12, further comprising:
identifying attributes of the recommended content using the parsed one or more components of the recommended content; and
retrieving attributes of previous content recommendations made by the user, wherein comparing the parsed one or more components to the one or more components of previous content recommendation comprises comparing the identified attributes of the recommended content to attributes of the previously recommended content made by the user to identify a subject matter match.

14. The system of claim 11, wherein assigning the candidate attribute to the user content recommendation comprises:
mapping the candidate attribute to the user content recommendation; and
storing the mapping of the candidate attribute to the user content recommendation in a data storage device.

15. The system of claim 14, wherein providing the candidate attribute that is eligible to be assigned to the user content recommendation includes retrieving the stored candidate attribute using the stored mapping to the user content recommendation.

16. The system of claim 11, further comprising:
in response to identifying the user content recommendation:
parsing the recommended content to identify the one or more components of the recommended content; and
determining a candidate attribute for the recommended content based on subject matter of content in the one or more components of the recommended content.

17. The system of claim 16, wherein assigning the candidate attribute to the user content recommendation comprises:

mapping the candidate attribute to the user content recommendation; and storing the mapping of the candidate attribute to the user content recommendation.

18. The system of claim 17, further comprising retrieving the stored candidate attribute using the stored mapping to the user content recommendation prior to the serving.

19. The system of claim 11, further comprising modifying presentation of the user interface indicating the selection of the candidate attribute in response to the user interaction with the selection control.

20. The system of claim 11, wherein assigning the candidate attribute comprises assigning, to the user content recommendation one or both of a category for the user content recommendation and a strength for the user content recommendation.

* * * * *